(12) United States Patent
Beckhardt

(10) Patent No.: US 10,681,463 B1
(45) Date of Patent: Jun. 9, 2020

(54) WIRELESS TRANSMISSION TO SATELLITES FOR MULTICHANNEL AUDIO SYSTEM

(71) Applicant: Sonos, Inc., Santa Barbara, CA (US)

(72) Inventor: Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/415,796

(22) Filed: May 17, 2019

(51) Int. Cl.
| H04R 5/04 | (2006.01) |
| H04R 5/02 | (2006.01) |
| H04S 7/00 | (2006.01) |
| H04S 3/00 | (2006.01) |

(52) U.S. Cl.
CPC ............... *H04R 5/04* (2013.01); *H04R 5/02* (2013.01); *H04S 3/008* (2013.01); *H04S 7/30* (2013.01); *H04R 2420/07* (2013.01); *H04S 2400/01* (2013.01)

(58) Field of Classification Search
CPC ........ H04R 5/04; H04R 5/02; H04R 2420/07; H04R 2420/03; H04R 2499/13; H04R 3/12; H04R 2205/022; H04S 3/008; H04S 3/00; H04S 7/30; H04S 2400/01; H04S 1/002
USPC .......................................... 381/300, 307, 303
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang et al. |
| 6,778,869 B2 | 8/2004 | Champion |
| 7,130,608 B2 | 10/2006 | Hollstrom |
| 7,130,616 B2 | 10/2006 | Janik |
| 7,143,939 B2 | 12/2006 | Henzerling |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Ahmad F. Matar
*Assistant Examiner* — Sabrina Diaz
(74) *Attorney, Agent, or Firm* — McDonnell Boehnen Hulbert & Berghoff LLP

(57) ABSTRACT

Some disclosed systems and methods include assigning channel streams to satellite playback devices, delaying initial transmission of surround sound content to satellite playback devices to accumulate audio samples for transmission in individual frames of surround sound content, and taking advantage of configured playback delays for different channels of surround sound content to prioritize transmission of channels of surround sound content having shorter configured playback delays over transmission of channels of surround sound content having longer configured playback delays.

20 Claims, 18 Drawing Sheets

(56) References Cited

U.S. PATENT DOCUMENTS

| | | |
|---|---|---|
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne et al. |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0123854 A1* | 7/2003 | Tanaka ................ G11B 20/10 386/241 |
| 2003/0157951 A1 | 8/2003 | Hasty |
| 2004/0024478 A1 | 2/2004 | Hans et al. |
| 2007/0142944 A1 | 6/2007 | Goldberg et al. |
| 2009/0240998 A1* | 9/2009 | Nikkila ............... H04L 12/6418 714/746 |
| 2011/0029684 A1* | 2/2011 | Campana ............... H04L 1/007 709/231 |
| 2015/0249813 A1* | 9/2015 | Cole ................... H04L 65/607 386/241 |
| 2016/0269828 A1* | 9/2016 | Smith ................... H04R 3/007 |
| 2017/0125027 A1* | 5/2017 | Filippini ............... G10L 19/167 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

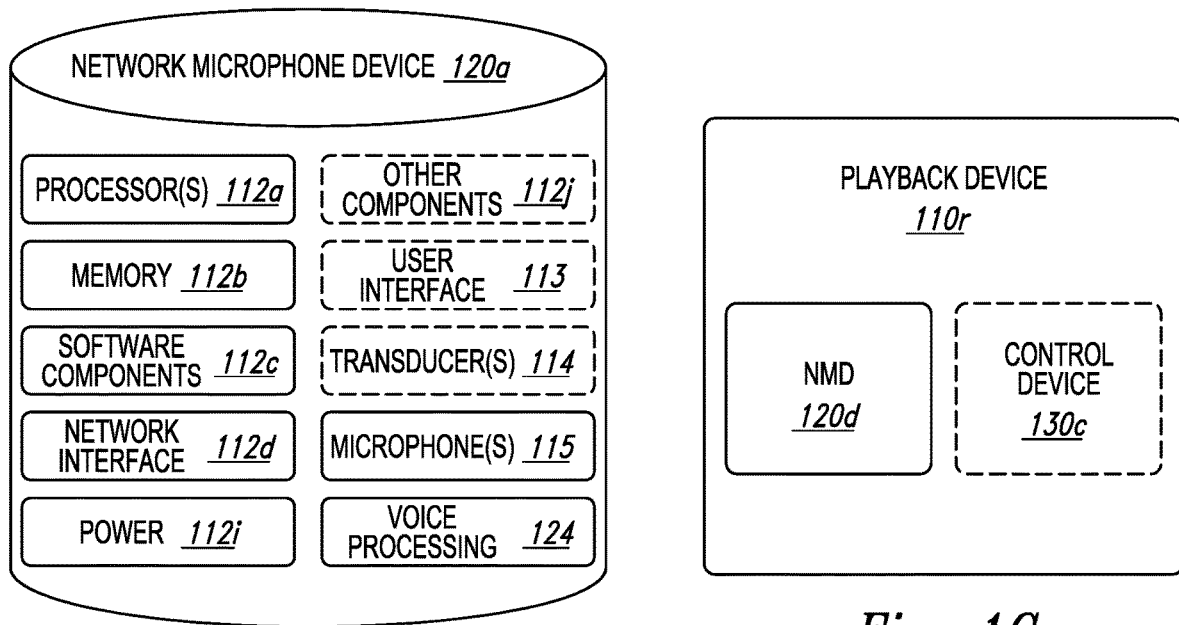
*Fig. 1F*
*Fig. 1G*
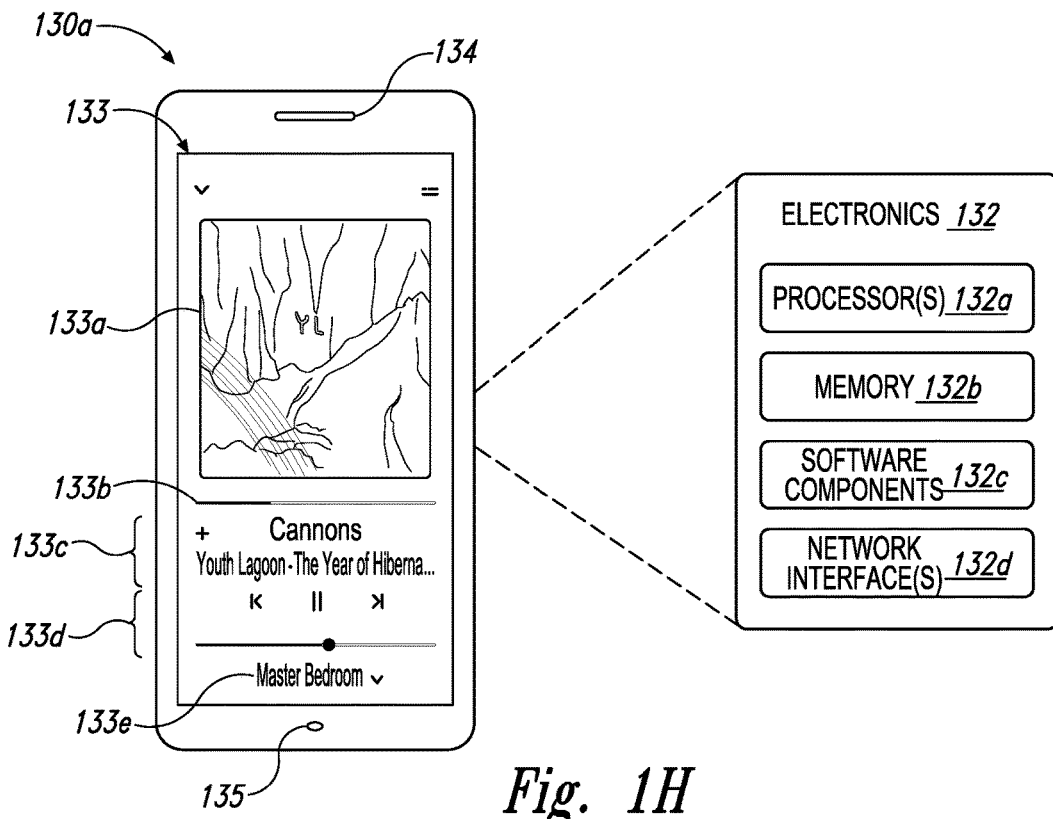
*Fig. 1H*

WIRELESS TRANSMISSION TO SATELLITES FOR MULTICHANNEL AUDIO SYSTEM

FIELD OF THE DISCLOSURE

The present disclosure is related to consumer goods and, more particularly, to methods, systems, products, features, services, and other elements directed to media playback and aspects thereof, including surround sound media.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
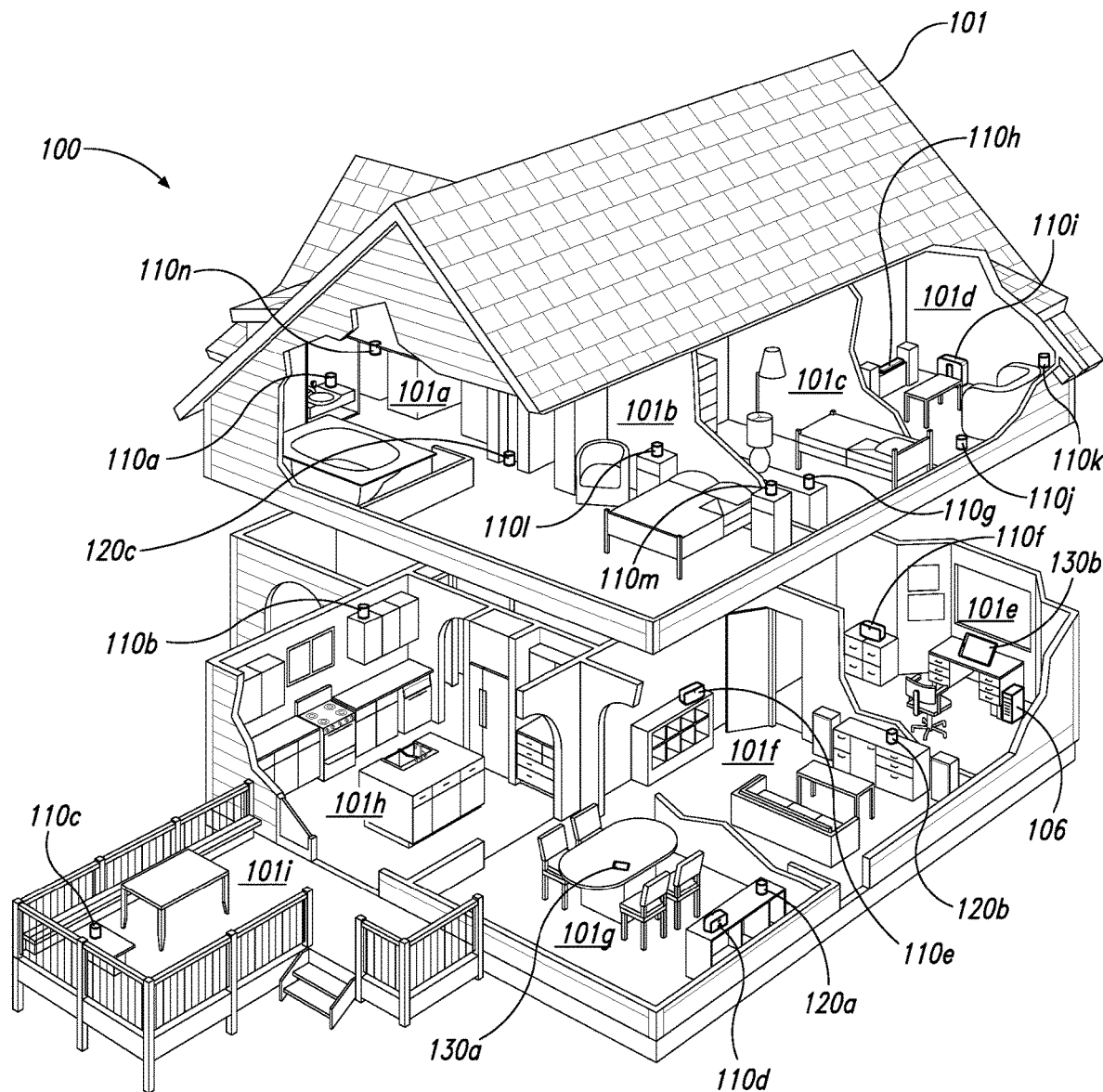
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Surround sound systems with satellite speakers distributed within a listening area can provide listeners with a highly immersive multimedia experience when (i) listening to music, (ii) playing video games, and/or (iii) watching television, movies, and/or other video or multimedia content. Wireless surround sound systems are desirable because the satellite speakers can be implemented quickly and easily without the need to run speaker cabling throughout the room to connect the satellite speakers to a central surround sound processor, such a soundbar, an audio tuner, audio/video head end, or other central surround sound processor. Additionally, wireless surround sound systems can be upgraded to add more satellites more easily than wired systems because existing satellites can be repurposed/repositioned (e.g., reconfiguring a rear satellite to function as a side satellite) within a room as new satellites are added to the system over time.

However, technical challenges arise when implementing wireless surround sound systems having more than 5-7 surround sound channels played back by more than about 3 satellite speakers or playback devices. In particular, for surround sound content that has corresponding video content, it is important for the surround sound system to process and distribute the multiple channels of surround sound content to all the satellite playback devices in the surround sound system for further processing and playback sufficiently quickly to ensure that the surround sound content collectively played by the surround sound system does not is not perceived to be out of sync with the corresponding video content. In addition to playing the surround sound content in sync with (or at least substantially in sync with) its corresponding video content, the various playback devices (headend devices and satellite devices) in the surround sound system should also play back their respective portions of the surround sound content in synchrony with each other so that the surround sound content does not have undesirable echo effects. But because of the processing and transmission time required to generate and distribute higher channel-count surround sound content among a larger number of satellite playback devices, it can be difficult for a headend device (e.g., a soundbar, audio/video tuner, or other device equipped with a surround sound processor) to process incoming surround sound content and distribute the surround sound content among multiple satellite playback devices of the surround sound system sufficiently fast in a real-time or substantially real-time manner so that the surround sound system can play the surround sound content both (i) in synchrony and (ii) in sync with corresponding video content.

The problems are further compounded in surround sound systems where individual playback devices are also configured to receive and process voice commands, e.g., requesting content for playback by the surround sound system and other voice requests, because of the additional processing load placed on the playback device to process the voice commands and the additional data that must be transmitted across the LAN in connection with processing these requests, particularly in view of the quick response times expected by users.

The systems and methods disclosed and described herein overcome these and other technical challenges that can arise with wireless multi-channel surround sound systems. In some embodiments, the systems and methods include assigning channel streams to satellite playback devices, delaying initial transmission of surround sound content to satellite playback devices to accumulate more audio samples for transmission in individual frames of surround sound content, and taking advantage of configured playback delays for different channels of surround sound content to prioritize transmission of channels of surround sound content having shorter configured playback delays over transmission of channels of surround sound content having longer configured playback delays.

For example, in some embodiments, a soundbar (or similar headend controller comprising a surround sound processor or similar processing capability) processes incoming surround sound content to generate a plurality of channel streams for organizing multiple channels of surround sound content for distribution among and playback by a plurality of wireless satellite playback devices. Some individual channel streams may comprise multiple subchannels, where each subchannel comprises a portion of the surround sound content corresponding to an individual surround sound channel for playback by playback device. For example, a channel stream for a rear satellite playback device configured to play a right rear channel and a right overhead channel may include a first subchannel for the rear right channel audio and a second subchannel for the rear right overhead audio. Some channel streams may comprise only a single channel of surround sound audio. For example, a channel stream for a subwoofer satellite playback device configured to play a single subwoofer channel may include only the subwoofer audio.

In operation, some embodiments include, after an initial delay period after beginning the generation of a plurality of channel streams comprising surround audio information, and during a first time interval, the soundbar, (i) for each satellite playback device in a first set of satellite playback devices, generates a first portion of a channel stream for the satellite playback device, and (ii) for each satellite playback device in a second set of satellite playback devices, generates a first portion of a channel stream for the satellite playback device. And during a second time interval following the first time interval, the soundbar (i) for each satellite playback device in the first set of satellite playback devices, generates a second portion of the channel stream for the satellite playback device, and (ii) for each satellite playback device in the second set of satellite playback devices, generates a second portion of the channel stream for the satellite playback device. And during a third time interval following the second time interval, the soundbar (i) for each satellite playback device in the first set of playback devices, generates a third portion of the channel stream for the satellite playback device and transmits the first portion and the second portion of the channel stream to the satellite playback device via the LAN and (ii) for each satellite playback device in the second set of satellite playback devices, generates a third portion of the channel stream for the satellite playback device. And during a fourth time interval following the third time interval, the soundbar (i) for each satellite playback device in the first set of satellite playback devices, generates a fourth portion of the channel stream for the satellite playback device and (ii) for each satellite playback device in the second set of satellite playback devices, generates a fourth portion of the channel stream for the satellite playback device and transmits the second portion and the third portion of the channel stream to the satellite playback device.

Although implementing a short delay after beginning the generation of a plurality of channel streams comprising surround audio information introduces an otherwise undesirable delay in the overall playback scheme by reducing the amount of time available to transmit the frames of the channel streams to the satellite playback devices and for the satellite playback devices to receive, process, and play the surround sound audio information within the frames of their channel streams as described herein, the short delay enables the headend processor (e.g., a soundbar or similar) to accumulate more audio samples to transmit to each satellite playback device, thereby improving the transmission efficiency of the system by transmitting more audio samples per frame than simply transmitting frames as they are generated (or more quickly after generation). Implementing the short delay between frame generation and frame transmission also enables the headend (e.g., the soundbar or similar) to distribute frames of audio to individual satellite playback devices in a way that prioritizes channels of audio content that are to be played earlier than other channels.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
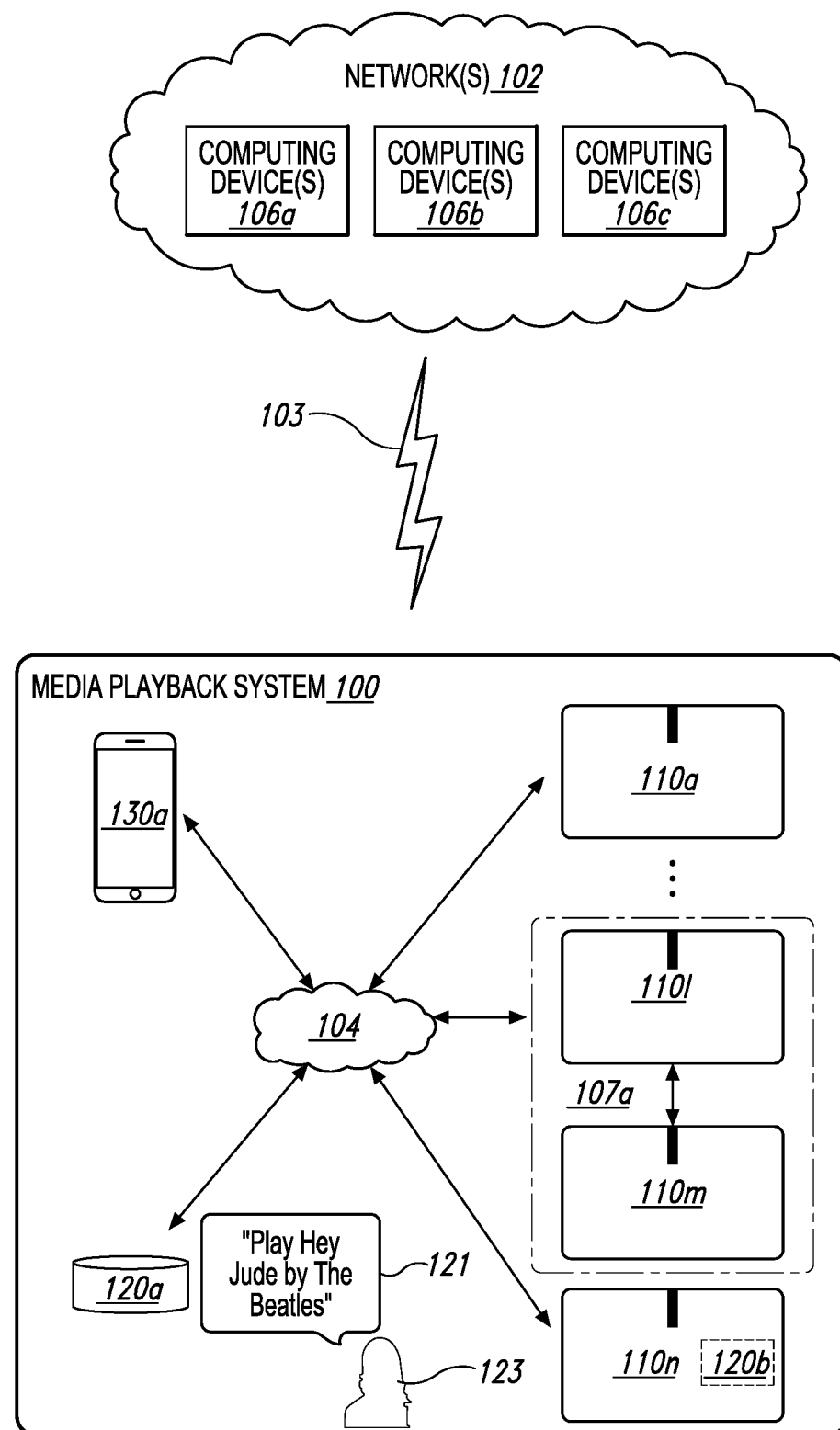
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
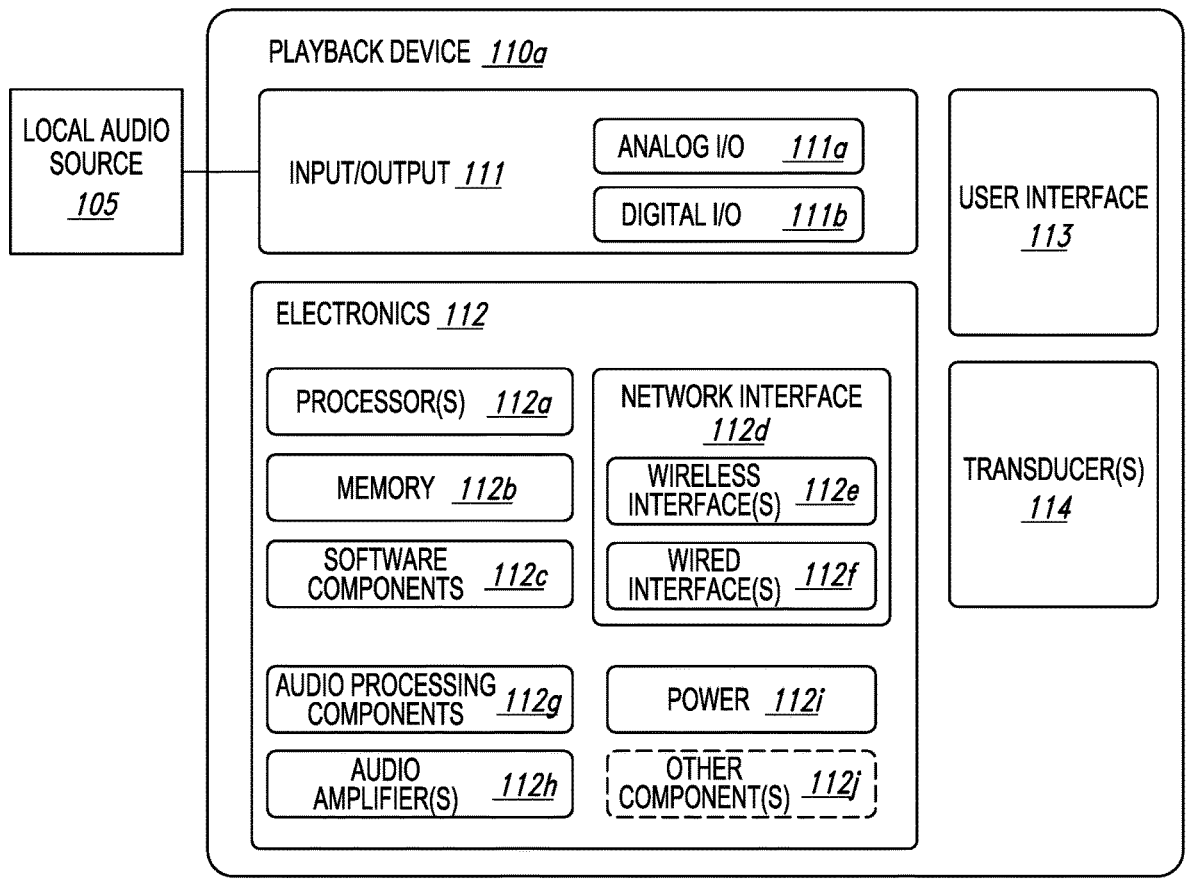
FIG. 1C shows a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals.

In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
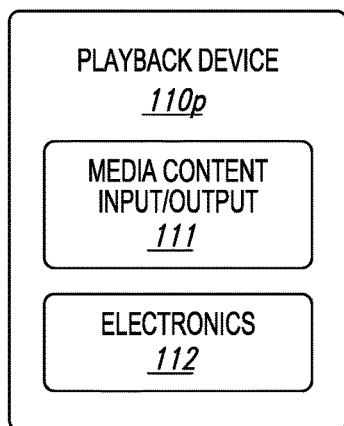
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
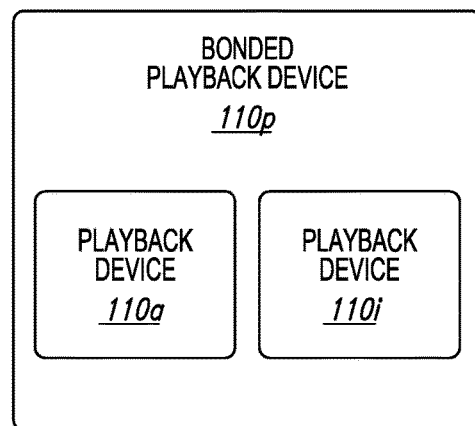
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100.

The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
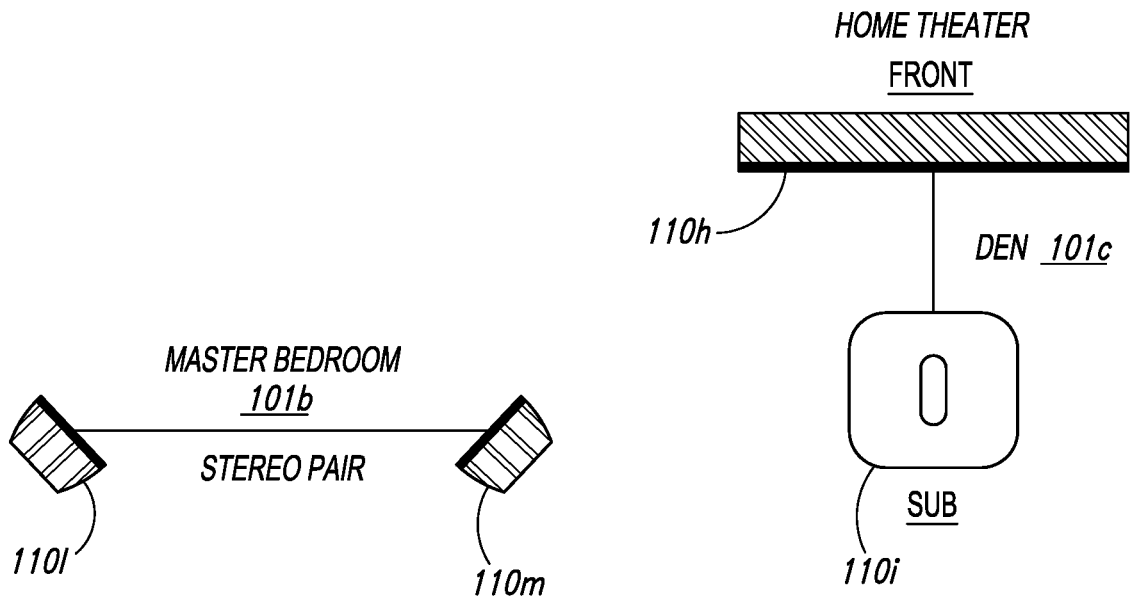
FIG. 1F shows a block diagram of a network microphone device.
FIG. 1G shows a block diagram of a playback device.
FIG. 1H shows a partially schematic diagram of a control device.
FIGS. 1-I through 1L show schematic diagrams of corresponding media playback system zones.
FIG. 1M shows a schematic diagram of media playback system areas.
Figures 1K, 1L:
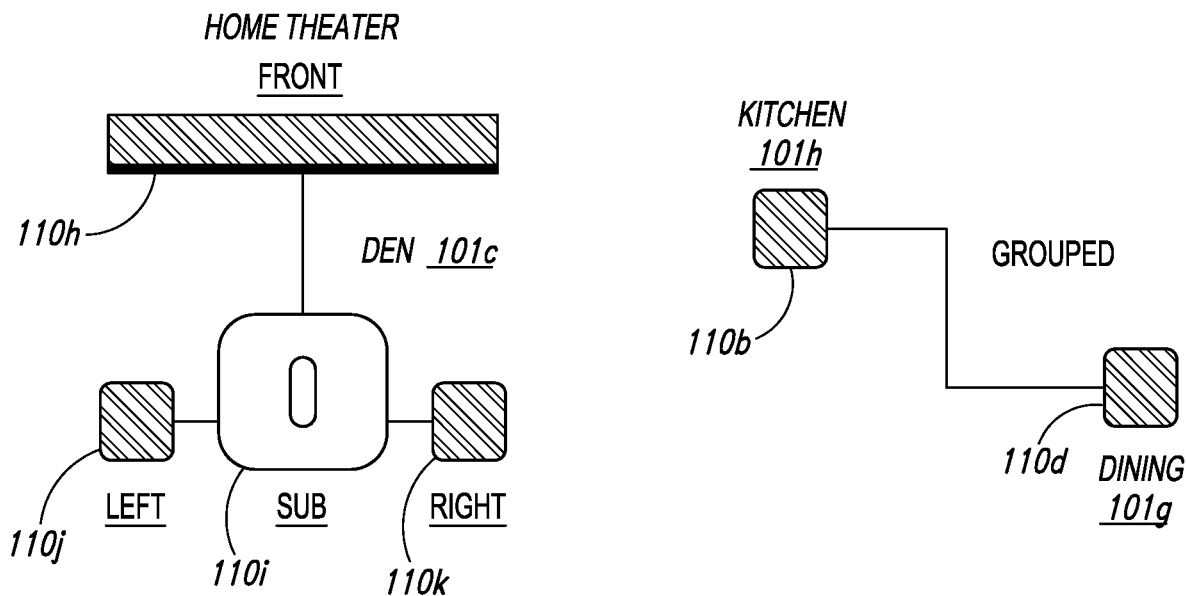
Figure 1M:
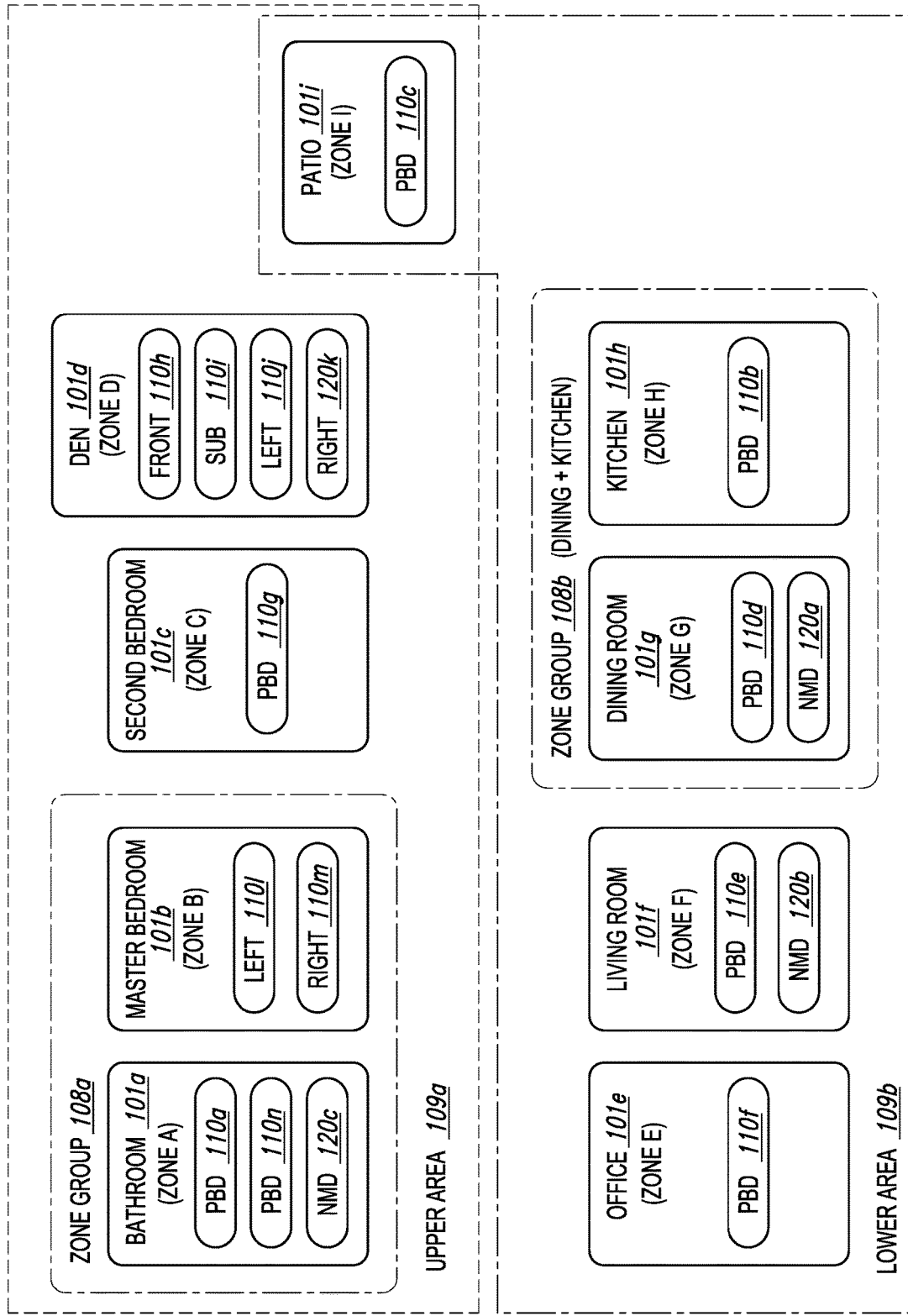

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
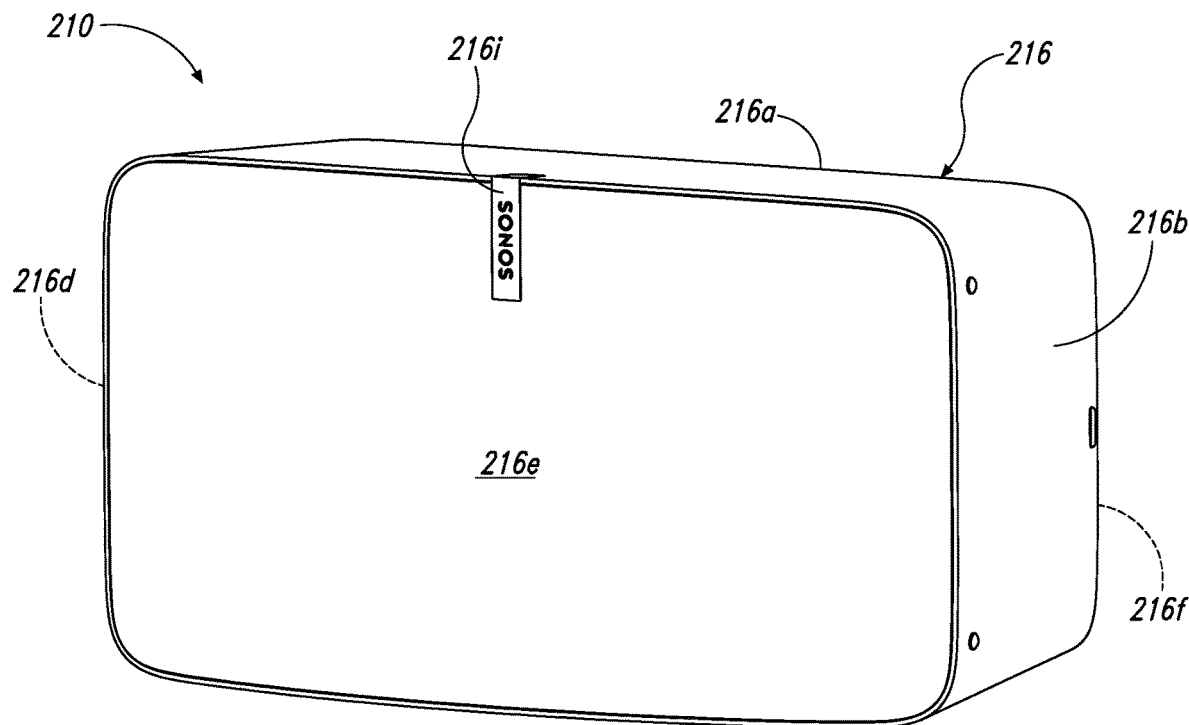
FIG. 2A shows a front isometric view of a playback device configured in accordance with aspects of the disclosed technology.
Figure 2B:
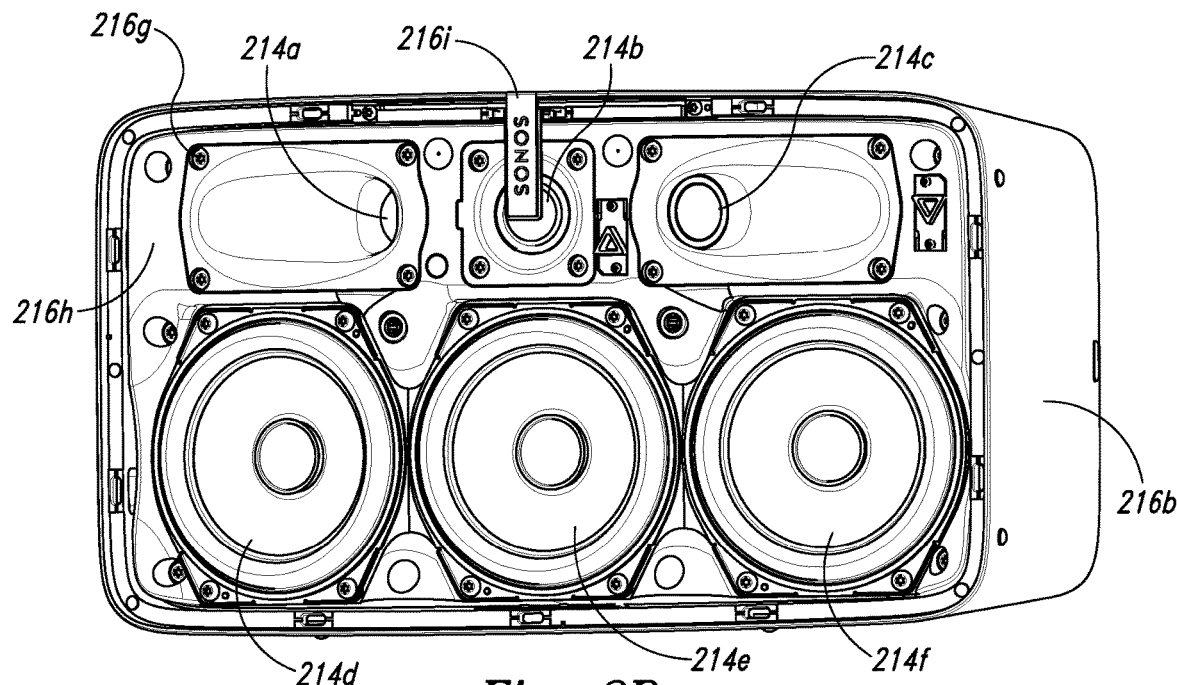
FIG. 2B shows a front isometric view of the playback device of FIG. 3A without a grille.
Figure 2C:
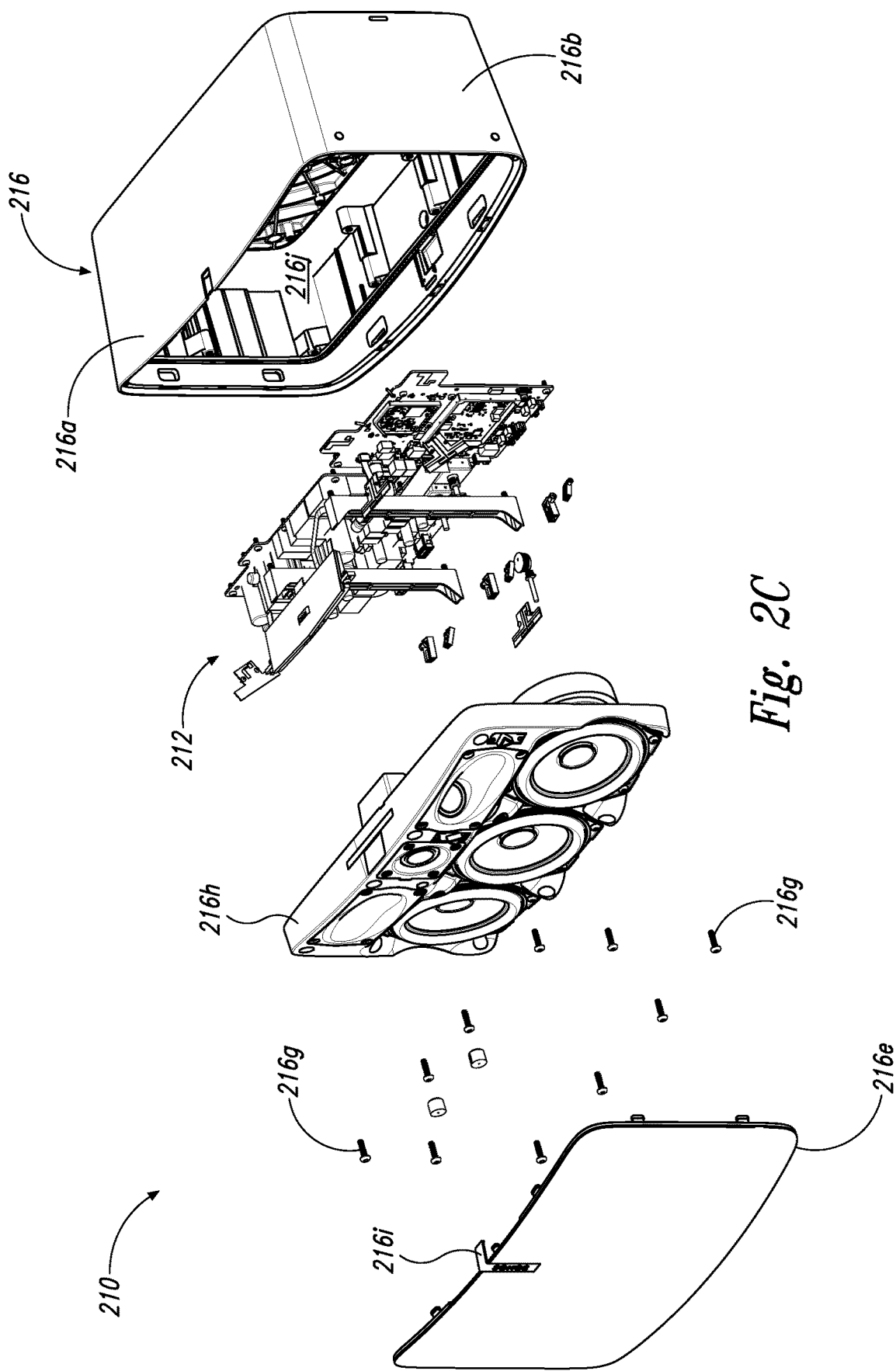
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
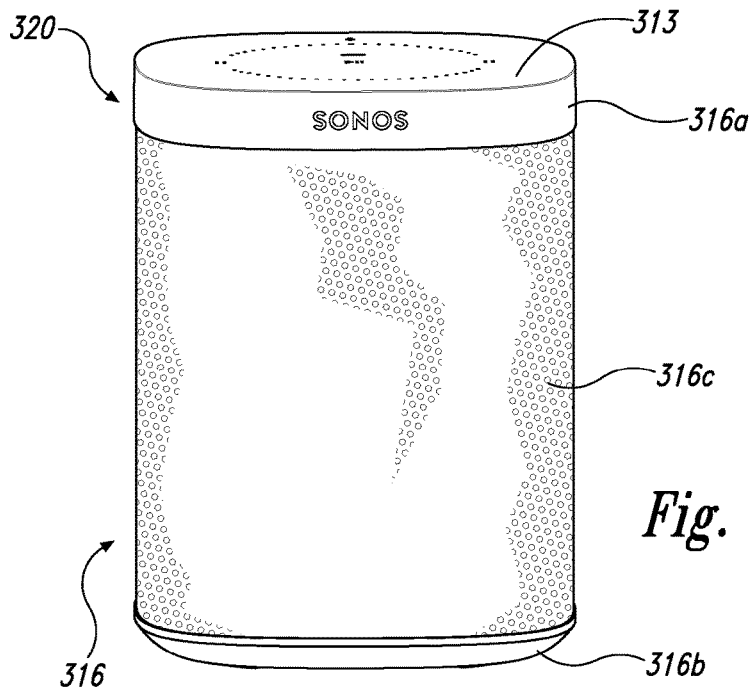
FIG. 3A shows a front view of a network microphone device configured in accordance with aspects of the disclosed technology.
Figure 3B:
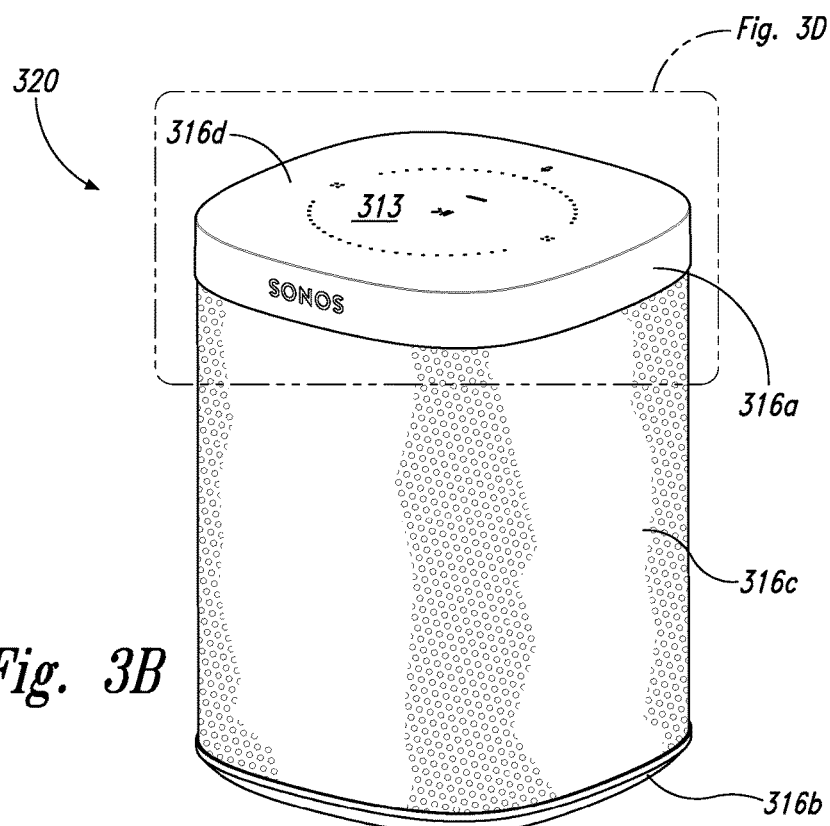
FIG. 3B shows a side isometric view of the network microphone device of FIG. 3A.
Figure 3C:
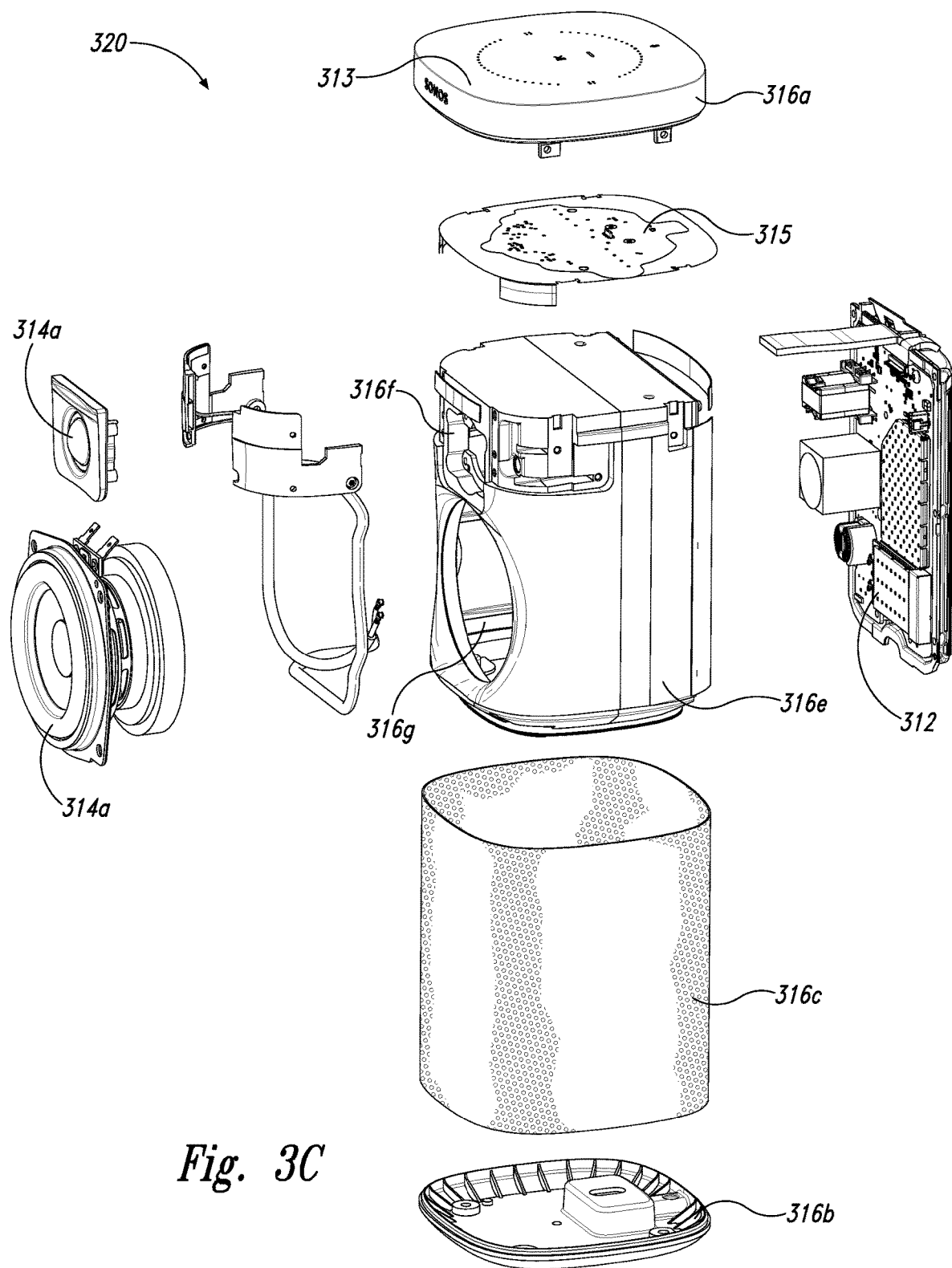
FIG. 3C shows an exploded view of the network microphone device of FIGS. 3A and 3B.
Figure 3D:
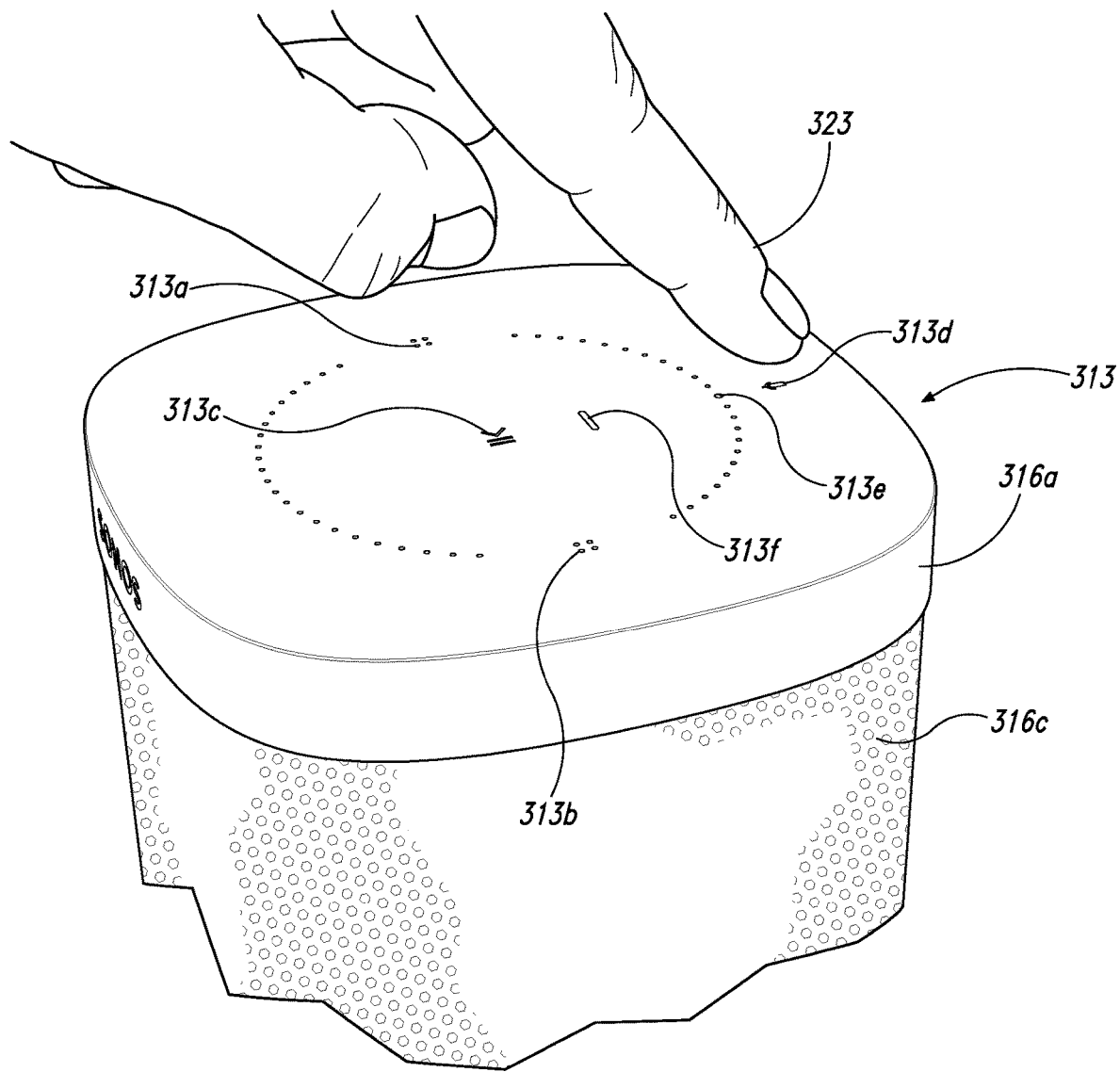
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
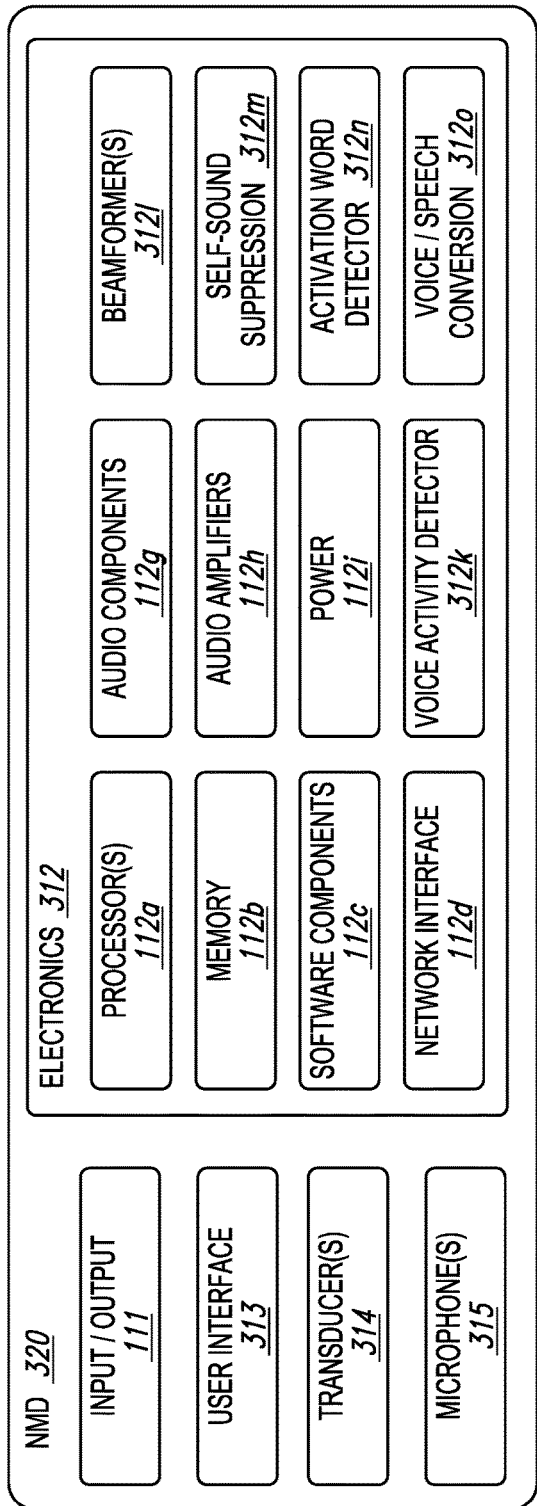
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
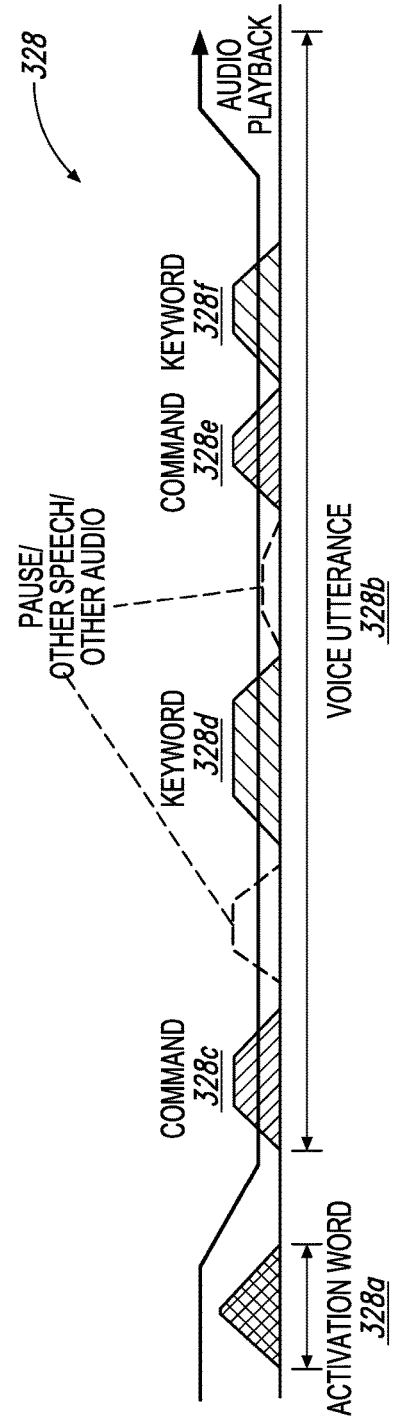
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
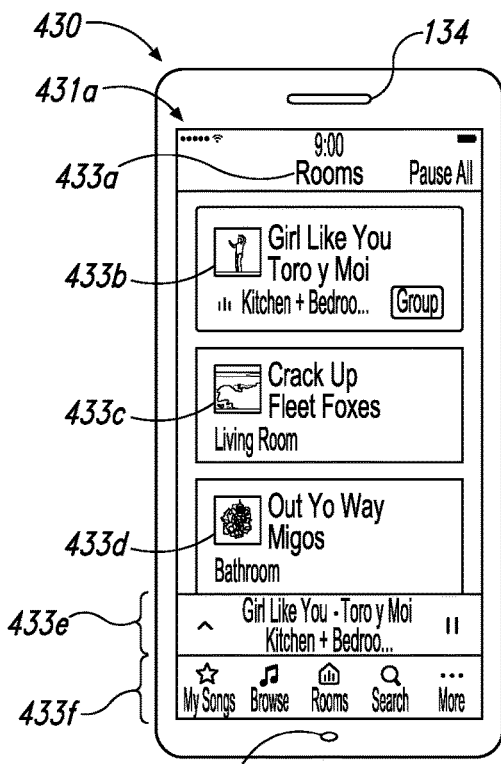
FIGS. 4A-4D show schematic diagrams of a control device in various stages of operation in accordance with aspects of the disclosed technology.
Figure 4B:
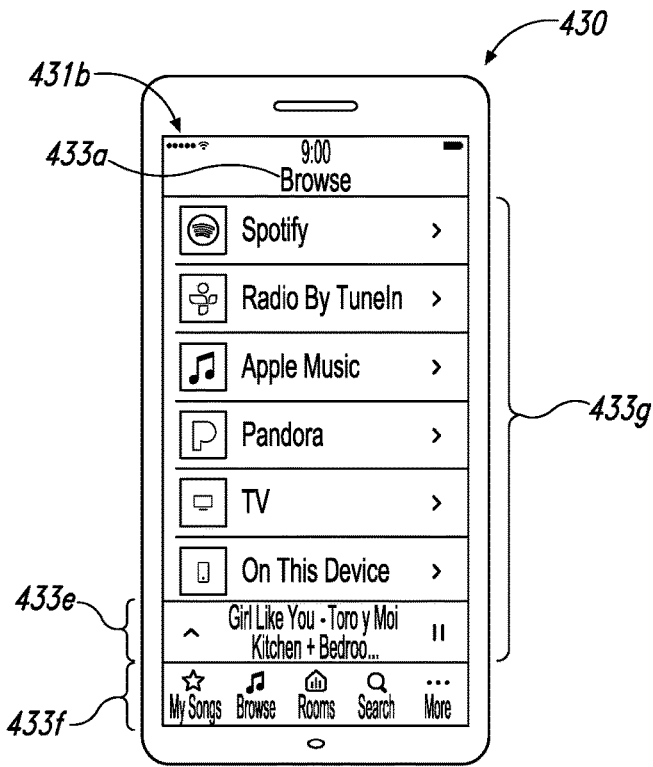
Figure 4C:
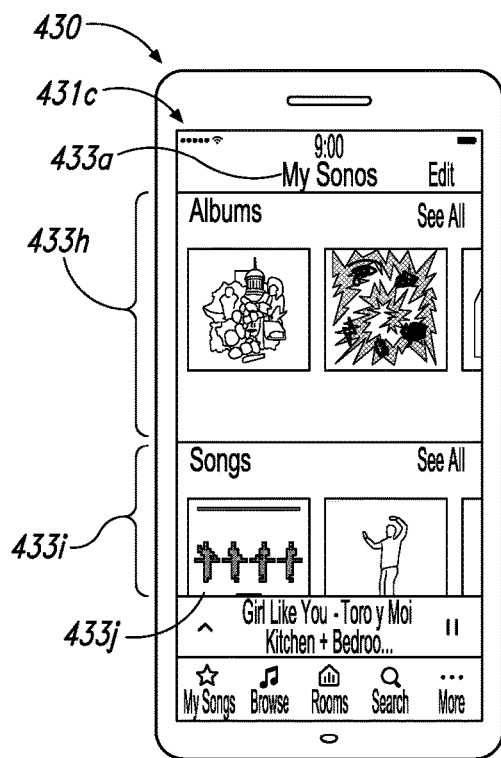
Figure 4D:
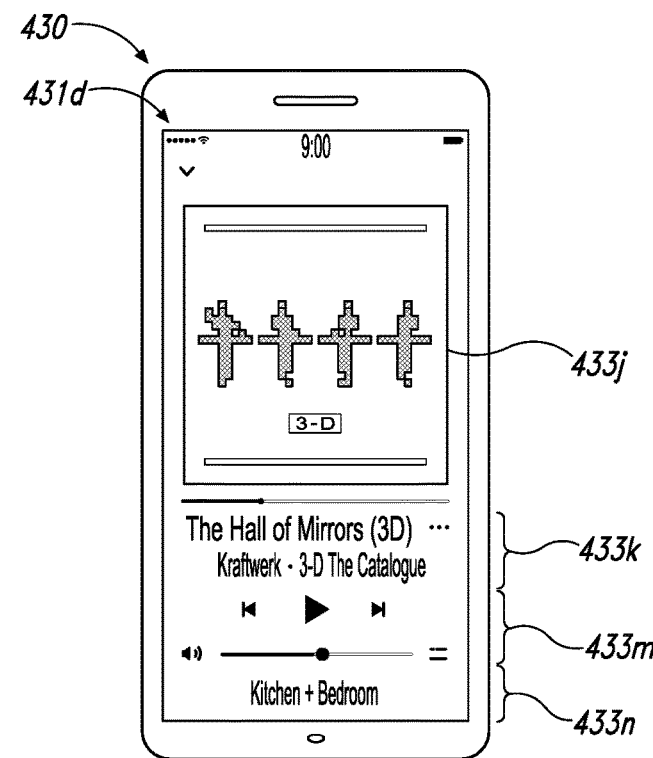

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
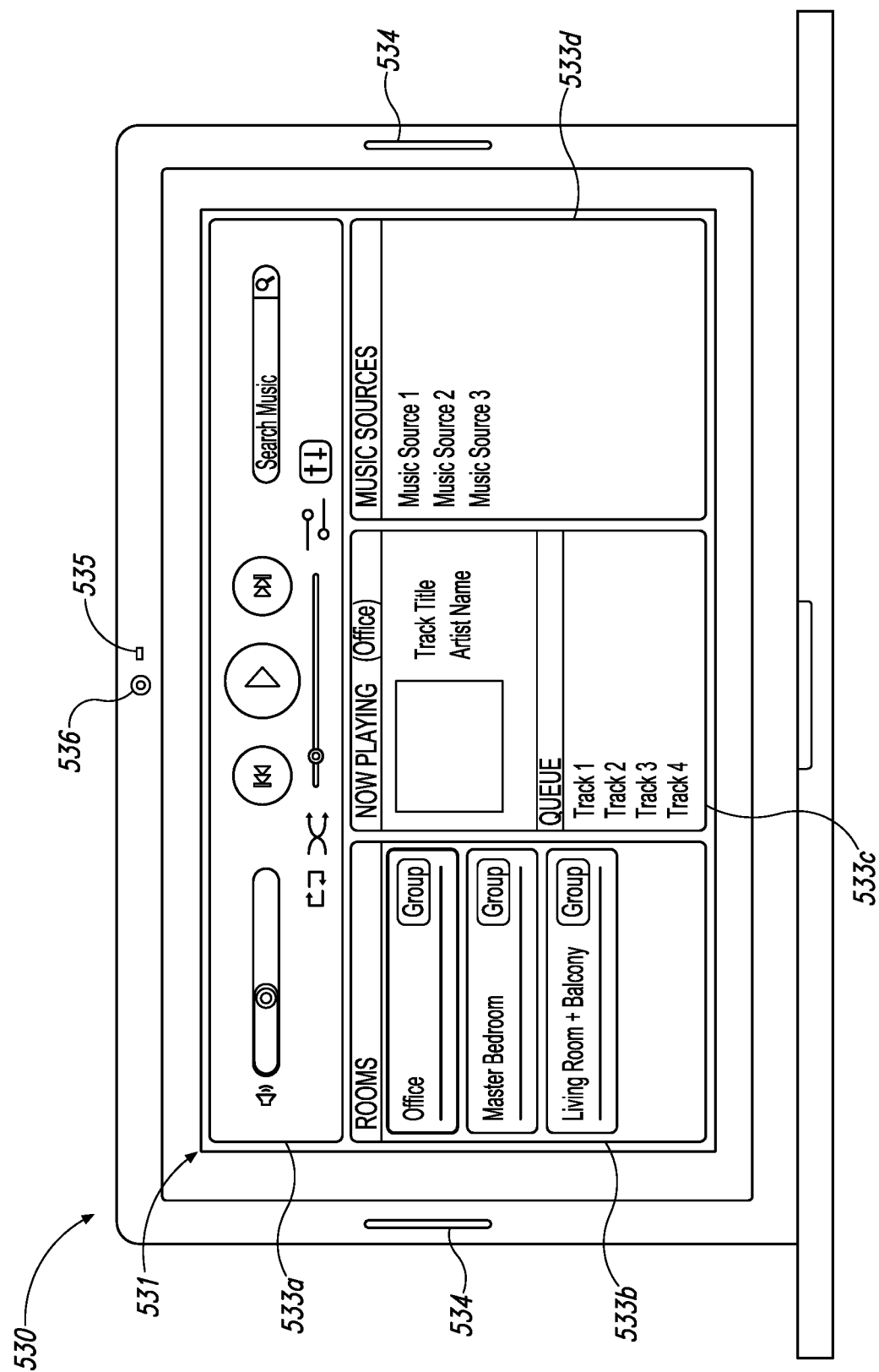
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
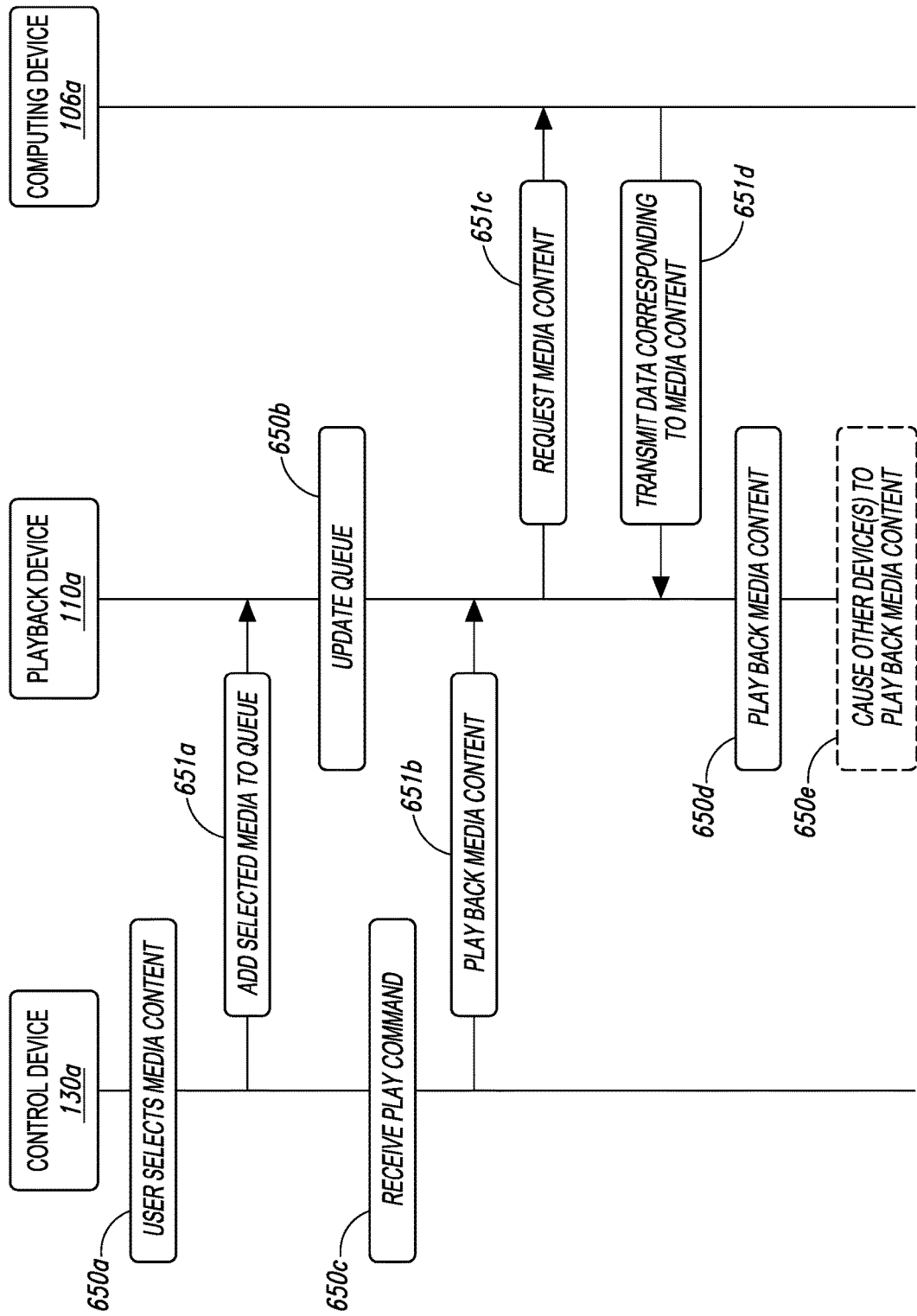
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, wireless surround sound systems are desirable for many reasons, including their ease of deployment, use, reconfigurability, and upgradeability. However, technical challenges arise when implementing wireless surround sound systems having more than 5-7 surround sound channels played more than about 3 satellite playback devices.

The systems and methods disclosed and described herein overcome the technical challenges that can arise with wireless multi-channel surround sound systems. In some embodiments, the systems and methods include assigning channel streams to satellite playback devices, delaying initial transmission of surround sound content to satellite playback devices to accumulate more audio samples for transmission of individual frames of surround sound content to satellite playback devices, and taking advantage of configured playback delays for different channels of surround sound content to prioritize transmission of channels of surround sound content having shorter playback delays to some satellite playback devices over transmission of channels of surround sound content having longer playback delays to other satellite playback devices.

V. Technical Features

In some embodiments, at least some aspects of the technical solutions derive from the technical structure and organization of the channel streams (and subchannels thereof), surround sound audio information, playback timing, and clock timing information that the soundbar and satellite playback devices use to play surround sound audio information transmitted/received via channel streams in synchrony with each other, including how a soundbar (or other device equipped with a surround sound processor) generates playback timing for surround sound audio information based on clock timing, and how satellite playback devices play surround sound audio information in synchrony with the soundbar and the other satellite playback devices based on playback timing and clock timing.

Therefore, to aid in understanding certain aspects of the disclosed technical solutions, certain technical details of the channel streams, surround sound audio information, playback timing, and clock timing information, as well the generation and use of playback timing and clock timing for playing surround sound audio information are described below. Except where noted, the technical details of the channel streams, surround sound audio information, playback timing, and clock timing information described below are the same or at least substantially the same for the examples shown and described with reference to FIGS. 7, 8, and 9.

a. Surround Sound Content

Surround sound content may be any type of surround sound content now known or later developed. In some embodiments, the surround sound audio content comprises surround sound content associated with video content. However, not all surround sound content is necessarily associated with video content. For example, some audio-only surround sound content may include movie soundtracks (without video), live concert recordings, immersive audio tracks, or similar content that may have been recorded for reproduction via a surround sound system but yet not have corresponding video content associated therewith.

In some embodiments, a surround sound processor for the surround sound system receives surround sound content from a surround sound content source, processes the surround sound content to generate a plurality of channel streams (described further herein) comprising portions of the surround sound content (e.g., referred to as surround sound audio information, or audio samples of surround sound audio information), and transmits the channel streams comprising the surround sound audio information to one or more satellite playback devices over a Local Area Network (LAN), as described further herein.

In some embodiments, the surround sound processor is a standalone surround sound controller comprising one or more processors, one or more network and/or other interfaces, and tangible, non-transitory computer-readable media storing program code executed by the one or more processors to cause the surround sound controller to perform the surround sound processing features and functions described herein. In some embodiments, the surround sound controller or processor is a component of a playback device within the multi-channel surround sound system. For example, the surround sound processor in some embodiments may be a component of a soundbar, entertainment head-end, television, audio tuner, computer, or other device comprising one or more processors, one or more network and/or other interfaces, and tangible, non-transitory computer-readable media storing program code executed by the one or more processors to cause the surround sound processor to perform the features and functions described herein.

In some embodiments, the surround sound content received by the surround sound processor comprises multiple discrete surround sound channels, where each discrete surround sound channel is intended for playback by one or more predetermined speakers in a set of speakers in the surround sound system, e.g., left front, right front, center, sub, left rear, right rear, etc. in a Dolby® Pro Logic® 5.1, 7.1, 9.1, 11.1 or other channel-based surround sound format. In some embodiments, the surround sound content received by the surround sound processor comprises surround sound content and surround sound audio object data, e.g., in a Dolby Atmos® format, DTS:X® format, or other audio object-based format. In some embodiments that use audio object data (or similar data) like Dolby Atmos®, DTS:X®, and similar formats, the surround sound processor component uses the audio object data and the surround sound content to render multiple channel streams comprising portions of the surround sound content (based on the configuration of the surround sound system), and then provides the rendered channel streams to one or more playback devices (e.g., a soundbar and one or more satellite playback devices) for playback.

In some embodiments, the surround sound processor receives surround sound content from a surround sound content source in digital form, e.g., as a stream of packets. In some embodiments, individual packets in the stream of packets have a sequence number or other identifier that specifies an ordering of the packets. Packets transmitted over a data packet network (e.g., Ethernet, WiFi, or other packet networks) may arrive out of order, so the surround sound processor uses the sequence number or other identifier to reassemble the stream of packets in the correct order before performing further processing of the surround sound content. In some embodiments, the sequence number or other identifier that specifies the ordering of the packets is or at least comprises a timestamp indicating a time when the packet was created by a device that transmitted the packet. The packet creation time can be used as a sequence number based on an assumption that packets are created in the order in which they should be subsequently processed to create channel streams.

After obtaining the surround sound content from the surround sound content source and processing the surround sound content to generate channel streams comprising surround sound audio information as described herein, the surround sound processor (or the playback device comprising the surround sound processor) in some embodiments (i) plays at least a portion of the processed surround sound content and/or (ii) transmits at least a portion of the processed surround sound content to one or more other playback devices.

b. Surround Sound Content Source

In operation, the surround sound processor component obtains any of the aforementioned types of surround sound content from a surround sound content source via an interface, e.g., a wired or wireless network interface(s), a "line-in" analog interface, a digital audio interface, an HDMI interface, an optical interface, or any other interface suitable for receiving audio content in digital or analog format now known or later developed.

A surround sound content source is any system, device, or application that generates, provides, or otherwise makes available any of the aforementioned surround sound content to a surround sound processor. For example, in some embodiments, a surround sound content source includes any one or more of a streaming media (audio, video) service, digital media server or other computing system, VAS service, gaming console, television, cable set-top-box, streaming media player (e.g., AppleTV, Roku, gaming console), CD/DVD player, telephone, tablet, or any other source of surround sound content now known or later developed.

c. Channel Streams

Figure 7:
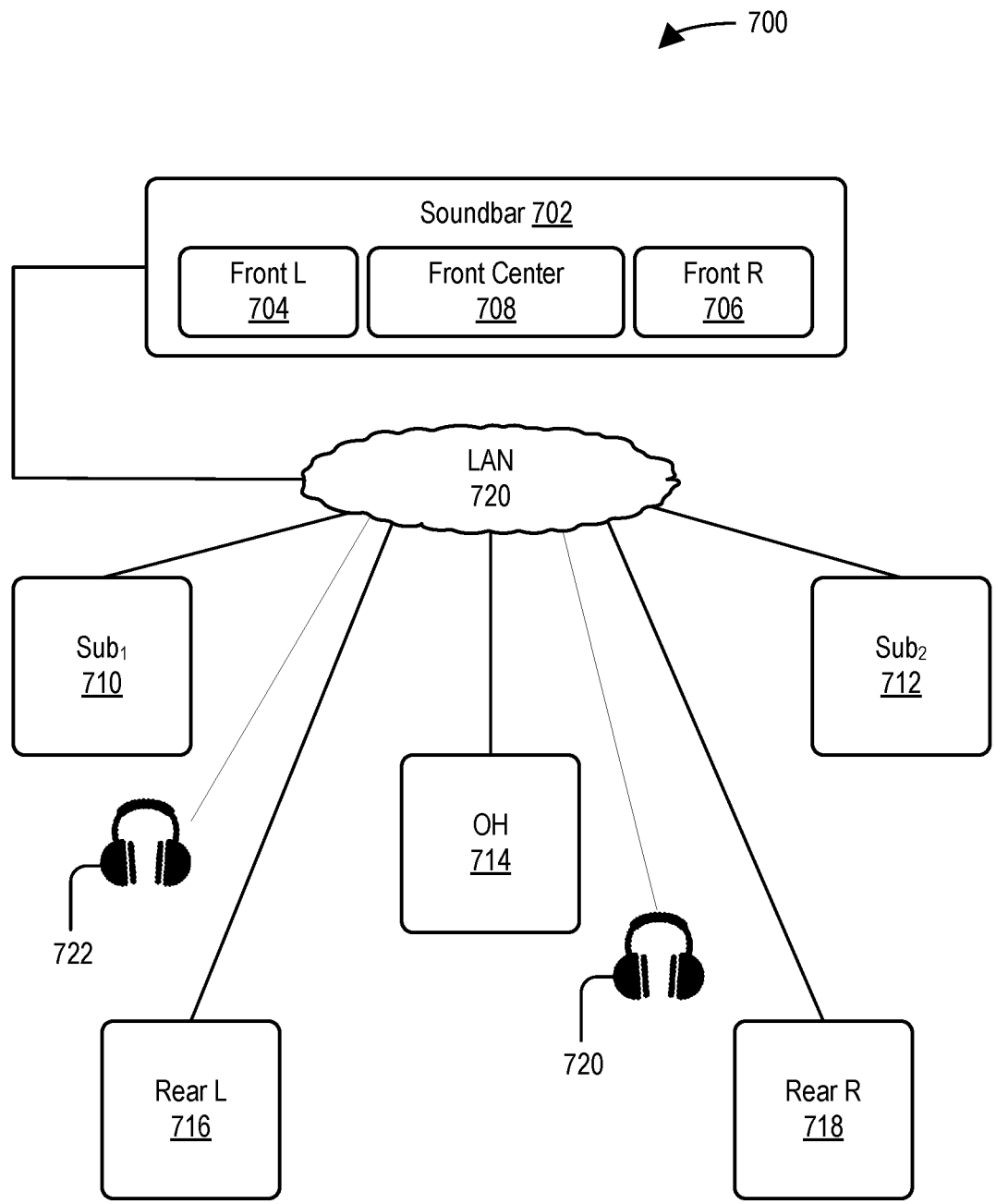
FIG. 7 shows an example configuration of a multichannel audio system according to some embodiments.

In some embodiments, the surround sound processor (i) generates channel streams based on the surround sound content and (ii) transmits one or more of the generated channel streams (or at least one or more portions thereof) to one or more playback devices in the multi-channel surround sound system as described in further detail herein. As illustrated in FIG. 7, in some embodiments, a soundbar comprising the surround sound processor (i) generates channel streams based on the surround sound content and (ii) transmits one or more of the generated channel streams (or at least one or more portions thereof) to individual satellite playback devices in the surround sound system.

In operation, each channel stream includes surround sound audio information based on at least a portion of the surround sound content received by the surround sound processor. In some embodiments, each channel stream may additionally include playback timing for the surround sound audio information in the channel stream. In some embodiments, the surround sound processor generates the playback timing for the surround sound audio information in each channel stream. In some embodiments, individual channel streams comprise two or more subchannels of surround sound audio information. For example, a channel stream for a playback device may include left and right subchannels. In another example, a channel stream for a playback device may include subchannels for forward-firing and up-firing audio content.

In some embodiments, an individual channel stream includes both (i) the surround sound audio information for the channel stream and (ii) the playback timing for the surround sound audio information of the channel stream. For some embodiments where a channel stream includes multiple subchannels, each subchannel includes audio information for the subchannel and playback timing for the audio information of the subchannel. But for some embodiments where a channel stream includes multiple subchannels, each subchannel includes audio information for the subchannel, but the channel stream includes playback timing for the set of subchannels, e.g., when a playback device is configured to play audio information from multiple subchannels at the same time.

Alternatively, in some embodiments, an individual channel stream includes the surround sound audio information for the channel stream, and the playback timing for the surround sound audio information for the channel stream is sent separately from the surround sound audio information of the channel stream.

In some embodiments, an individual channel stream includes a plurality of frames (or cells, or packets), wherein an individual frame includes a portion (e.g., a set of audio samples) of surround sound audio information and a playback time for that portion of the surround sound audio information (e.g., a playback time for that set of audio samples). In some embodiments, and as described further herein, the playback time for that portion of the surround sound audio information corresponds to a future time relative to a clock time of a clock the surround sound processor uses to generate the playback timing for that portion of the surround sound audio information.

In some embodiments, the soundbar (or other component comprising the surround sound processor) transmits individual channel streams to individual satellite playback devices using each satellite playback device's individual network address. For example, in some embodiments, each satellite playback device has a corresponding unicast network address, and the soundbar transmits each individual channel stream to the channel stream's corresponding satellite playback device via that satellite playback device's corresponding unicast network address. Each satellite playback device receives its corresponding channel stream via its corresponding unicast network address.

In some embodiments, the soundbar (or other component comprising the surround sound processor) alternatively transmits one or more of the channel streams to one or more of the satellite playback devices using a multicast network address, and one or more satellite playback devices in the surround sound system receive the channel stream via that multicast address.

For example, in some embodiments, the soundbar transmits all of the channel streams to a multicast network address, and all of the satellite playback devices receive all of the channel streams via the multicast network address. Then, at each satellite playback device, the satellite playback device determines which channel stream(s) it should process to generate analog audio signals for playback.

In another example, the soundbar transmits a first set of two or more channel streams to a first multicast address, a second set of two or more channel streams to a second multicast address, and so on. And a first set of two or more satellite playback devices receives the first set of two or more channel streams via the first multicast address, and a second set of two or more satellite playback devices receives the second set of two or more channel streams via the second multicast address. Then, at each satellite playback device in the first set of two or more satellite playback devices, the satellite playback device determines which channel stream(s) it should process to generate analog audio signals for playback. And at each satellite playback device in the second set of two or more satellite playback devices, the satellite playback device determines which channel stream(s) it should process to generate analog audio signals for playback.

d. Playback Timing

Playback devices (including the soundbar and the satellite playback devices) disclosed and described herein use playback timing for surround sound audio information in a channel stream to generate and playback analog audio signals based on surround sound audio information in the channel stream. In some embodiments, the soundbar (or other component comprising a surround sound processor) generates the playback timing for the surround sound audio information for each channel stream based on clock timing (described below).

In some embodiments, the soundbar (i) generates playback timing for surround sound audio information of an individual channel stream based on clock timing from a local clock at the soundbar, and (ii) transmits the generated playback timing to all other playback devices configured to receive the individual channel stream and play the surround sound audio information in that individual channel stream.

In operation, when generating playback timing for an individual frame (or packet) of a channel stream (or subchannel thereof), the soundbar adds a "timing advance" to the current clock time of a local reference clock of the soundbar. Adding this "timing advance" to the current clock time results in a playback time for the frame/packet (or frames/packets) that amounts to a future time relative to that current clock time of the soundbar at the time the soundbar generated the frame(s)/packet(s) comprising the portion(s) of the surround sound audio information.

In some embodiments, the "timing advance" is based on an amount of time that is greater than or equal to the sum of (i) the network transit time required for frames and/or packets of the channel stream comprising the surround sound audio information transmitted from the soundbar to arrive at the satellite playback device(s) configured to use the playback timing for playing the surround sound audio information in that channel stream and (ii) the amount of time required for the satellite playback device(s) configured to use that playback timing to receive, process, and play the surround sound audio information in that channel stream.

In some embodiments, the soundbar determines a timing advance by sending one or more test packets to one or more (or perhaps all) satellite playback devices configured to play surround sound content, and then receiving test response packets back from the satellite playback devices. In some embodiments, the soundbar and the one or more satellite playback devices negotiate a timing advance via multiple test and response messages. In some embodiments with two or more satellite playback devices, the soundbar determines a timing advance by exchanging test and response messages with all of the satellite playback devices, and then setting a timing advance that is sufficient for the satellite playback device having the longest total of network transmit time and packet processing time.

In some embodiments, the timing advance is less than about 15-20 milliseconds. In further embodiments, the timing advance is less than about 10 milliseconds. In some embodiments, the timing advance remains constant after being determined, or at least remains constant for a substantial duration, e.g., during an entire surround sound playback session. In other embodiments, the soundbar can change the timing advance (including changing the timing advance during a surround sound playback session) in response to a request from a satellite playback device indicating that a greater timing advance is required (e.g., because the satellite playback device is not receiving packets of its channel stream comprising portions of surround sound audio content until after other satellite playback devices have already played corresponding portions of the surround sound content) or a shorter timing advance would be sufficient (e.g., because the satellite playback device is buffering more packets of its channel stream comprising portions of surround sound audio information than necessary to provide consistent, reliable playback).

In some embodiments, the playback timing is generated for individual frames (or packets), or individual sets of frames or packets, comprising audio samples of the surround sound audio information of a channel stream. As described above, in some embodiments, the surround sound audio information is packaged in a series of frames (or packets) where individual frames (or packets) comprise a portion of the surround sound audio information, e.g., audio samples of the surround sound audio information. In some embodiments, the playback timing for the surround sound audio information includes a playback time for each frame (or packet) of the surround sound audio information. In some embodiments, the playback timing for an individual frame is included within the frame (or packet), e.g., in the header of the frame, in an extended header of the frame, in the payload portion of the frame, and/or in some other designated portion of the frame. In other embodiments, the playback timing for a set of frames (or packets) is included within one frame of the set of frames, or alternatively, the playback timing for the set of frames is included in a separate frame associated with the corresponding set of frames.

In some embodiments, the playback time for an individual frame (or packet) is identified within a timestamp or other indication. In such embodiments, the timestamp (or other indication) represents a time to play the surround sound audio information within that individual frame (or packet), or perhaps groups/sets of frames or packets. In operation, when the playback timing for an individual frame (or packet) is generated, the playback timing for that individual frame is a future time relative to a current clock time of a reference clock at the time that the playback timing for that individual frame is generated.

e. Clock Timing

Clock timing can play an important role in synchronous playback of the surround sound content disclosed and described herein. In operation, the soundbar uses its own local clock and playback timing for surround sound audio information in a channel stream to generate and play analog audio signals based on the surround sound audio information in that channel stream. And each satellite playback device in the surround sound system uses clock timing information from the soundbar, the satellite playback device's local clock timing, and the playback timing for surround sound audio information in a channel stream to generate and play analog audio signals based on the surround sound audio information received in the channel stream.

To facilitate synchronous playback of the surround sound content by all the devices in the surround sound system, the soundbar (or other device comprising the surround sound processor) provides clock timing information to the satellite playback devices. This clock timing information includes a clock time of the reference clock that the soundbar uses to generate playback timing for surround sound audio information in an individual channel stream.

In some embodiments, each satellite playback device receives one or more channel streams comprising surround sound audio information and playback timing information for the surround sound audio information in the channel stream. The surround sound audio information and the playback timing for the surround sound audio information in each channel stream is unique to each channel stream. However, the soundbar generates the playback timing for each channel stream using the same reference clock. So, while each satellite playback device receives surround sound audio information and playback timing (for that surround sound audio information) unique to its channel stream(s), all the satellite playback devices receive the same clock timing information from the soundbar (or other device comprising the surround sound processor).

f. The Soundbar Using Playback Timing and Clock Timing to Play Surround Sound Content in Synchrony with Other Satellite Playback Devices As mentioned earlier, in some embodiments, the surround sound processor is a component of a soundbar that is configured to play one or more of the channel streams (or subchannels thereof) generated by the surround sound processor. In such embodiments, the soundbar uses its local clock timing to generate playback timing for the surround sound audio information in each channel stream that the surround sound processor generates (based on the surround sound content). In operation, the soundbar (i) plays one or more of the generated channel streams and (ii) transmits one or more other channel streams to the satellite playback device(s). Recall from above that the surround sound audio information in each channel stream has associated playback timing, and that the playback device tasked with playing the surround sound audio content for that channel stream (whether it's a soundbar or a satellite playback device) uses the playback timing to play the surround sound audio information of that channel stream.

For each channel stream that the soundbar is configured to play, the soundbar uses the previously-generated playback timing for the surround sound audio information of the channel stream and its locally-generated clock timing to generate and play analog audio signals based on the surround sound audio information of the channel stream. In operation, the soundbar plays an individual frame (or packet) comprising portions (e.g., audio samples) of the surround sound audio content when the soundbar's local clock that the soundbar used to generate the playback timing reaches the time specified in the playback timing for that individual frame (or packet).

For example, recall that when generating playback timing for an individual frame (or packet), the soundbar device adds a "timing advance" to the current clock time of the reference clock that the soundbar uses for generating the playback timing and for playing the surround sound audio information. So, if the timing advance for an individual frame is, for example, 15 milliseconds, then the soundbar plays the portion (e.g., a sample or set of samples) of surround sound audio content in an individual frame (or packet) 15 milliseconds after creating the playback timing for that individual frame (or packet).

By playing the portion(s) of the surround sound audio content of an individual frame and/or packet when the clock time of the local reference clock at the soundbar reaches the playback timing for that individual frame or packet, the soundbar plays that portion(s) of the audio content in that individual frame/packet in synchrony with the satellite playback devices.

g. Satellite Playback Devices Using Playback Timing and Clock Timing to Play Surround Sound Content in Synchrony with the Soundbar and Other Satellite Playback Devices Recall that, in some embodiments, the soundbar (or other device comprising the surround sound processor) transmits channel streams comprising surround sound audio information along with playback timing for the surround sound audio information to the satellite playback devices. The soundbar (or other device comprising the surround sound processor) also transmits clock timing information to the satellite playback devices. And while each satellite playback device receives surround sound audio information and playback timing (for that surround sound audio information) that is unique to its channel stream(s), all the satellite playback devices receive the same clock timing information from the soundbar (or other device comprising the surround sound processor).

To play an individual frame (or packet) of surround sound audio information in synchrony with the soundbar and the other satellite playback device(s), the satellite playback device, for each channel stream that the satellite playback device is configured to process, (i) receives the frames (or packets) of the channel stream comprising the portions of the surround sound audio information from the soundbar, (ii) receives the playback timing for the surround sound audio information from the soundbar (e.g., in the frame and/or packet headers of the frames and/or packets of the channel stream comprising the portions of the surround sound audio information or perhaps separately from the frames and/or packets of the channel stream comprising the portions of the surround sound audio information), (iii) receives the clock timing from the soundbar, and (iv) plays the portion(s) of the surround sound audio information in the individual frame (or packet) when the satellite playback device's local clock that the satellite playback device uses for playback reaches the playback time specified in the playback timing for that individual frame (or packet) of surround sound audio information received from the soundbar, as adjusted by a "timing offset."

In operation, after the satellite playback device receives clock timing from the soundbar (or other device comprising the surround sound processor), the satellite playback device determines a "timing offset" for the satellite playback device. This "timing offset" comprises (or at least corresponds to) a difference between the "reference" clock at the soundbar (that the soundbar used to generate the playback timing) and a "local" clock at the satellite playback device that the satellite playback device uses to play the surround sound content. In operation, each satellite playback device that receives the clock timing from the soundbar calculates its own "timing offset" based on the difference between its local clock and the clock timing received from the soundbar, and thus, the "timing offset" that each satellite playback determines is specific to that particular satellite playback device. As such, each of the satellite playback devices may operate with different timing offsets.

In some embodiments, when playing back the surround sound audio information of a particular channel stream, the satellite playback device generates new playback timing (specific to the satellite playback device) for individual frames (or packets) of surround sound audio information by adding the previously determined "timing offset" to the playback timing for each frame (or packet) of surround sound audio information of the channel stream received from the soundbar. With this approach, the satellite playback device converts the playback timing for the surround sound audio information received from the soundbar into "local" playback timing for the satellite playback device. Because each satellite playback device calculates its own "timing offset," each satellite playback device's determined "local" playback timing for an individual frame is specific to that particular satellite playback device.

And when the "local" clock that the satellite playback device is using for playing back the surround sound audio information received via the channel stream reaches the "local" playback time for an individual frame (or packet) comprising portions (e.g., audio samples) of the surround sound audio information, the satellite playback device plays the portions of surround sound audio information (e.g., the audio samples of surround sound information) associated with that individual frame (or packet).

Thus, each satellite playback device plays frames (or packets) comprising portions of the surround sound audio information of its assigned channel stream(s) according to the playback timing for that surround sound audio information as adjusted by the "timing offset" based on a difference between the satellite playback device's clock timing and the soundbar's clock timing. And because the soundbar generated the playback timing for those frames (or packets) of surround sound audio information for each satellite playback device's assigned channel stream(s) relative to the soundbar's local clock timing, and further, because the soundbar uses that same local clock timing to play corresponding frames (or packets) of surround sound audio information of the channel stream(s) assigned to the soundbar, each satellite playback device and the soundbar play their corresponding frames (or packets) comprising corresponding portions of surround sound audio information for the same surround sound content in synchrony, i.e., at the same time or at substantially the same time, even when none of the soundbar or playback devices are synchronized to a master clock.

VI. Example Wireless Surround Sound System Architecture

FIG. 7 shows an example configuration of a multichannel surround sound system 700 according to some embodiments.

The multichannel surround sound system 700 comprises a plurality of playback devices, including a Soundbar 702, a $Sub_1$ 710, a $Sub_2$ 712, an Overhead 714, a Rear L 716, and a Rear R 718. In operation, the plurality of playback devices 702, 710-718 are configured to communicate with each other directly and/or indirectly via a Local Area Network (LAN) 720. In some embodiments, the Soundbar 702, $Sub_1$ 710, $Sub_2$ 712, Overhead 714, Rear L 716, and Rear R 718 playback devices are connected to the LAN 720, and the Soundbar 702 communicates directly with the satellite playback devices (i.e., the $Sub_1$ 710, $Sub_2$ 712, Overhead 714, Rear L 716, and Rear R 718 playback devices) via direct wireless transmissions so that packets and/or frames transmitted between and among the Soundbar 702, $Sub_1$ 710, $Sub_2$ 712, Overhead 714, Rear L 716, and Rear R 718 playback devices need not traverse a WiFi router or LAN access point. In other embodiments, packets and/or frames transmitted between and among the Soundbar 702, $Sub_1$ 710, $Sub_2$ 712, Overhead 714, Rear L 716, and Rear R 718 playback devices traverse an intermediate WiFi router or LAN access point as in a typical WiFi LAN configuration. In some embodiments, some packets/frames transmitted directly between and among the Soundbar 702, $Sub_1$ 710, $Sub_2$ 712, Overhead 714, Rear L 716, and Rear R 718 playback devices without traversing a WiFi router or access point, and some packets/frames transmitted indirectly (e.g., traverse a WiFi router or access point) between and among the Soundbar 702, $Sub_1$ 710, $Sub_2$ 712, Overhead 714, Rear L 716, and Rear R 718 playback devices. For example, in some embodiments, the Soundbar 702 may transmit channel streams (and perhaps other transmissions associated with synchronous playback, such as clock timing and/or playback timing) to individual satellite playback devices (i.e., the $Sub_1$ 710, $Sub_2$ 712, Overhead 714, Rear L 716, and Rear R 718 playback devices) via direct wireless transmissions that do not traverse a WiFi router or access point, but the Soundbar 702 may transmit packets/frames comprising other data (e.g., other management and control signaling and messages) to the individual satellite playback devices via transmissions that traverse the WiFi router or access point.

The Soundbar 702 is configured to play (i) a front left channel (FL) via Front L speaker 704, (ii) a front right channel (FR) via Front R speaker 706, and (iii) a front center channel (FC) via Front Center speaker 708. Collectively, the set of FL, FR, and FC channels are sometimes referred to herein as the front channels, or F channels. In some embodiments, the Soundbar 702 is additionally configured to play certain overhead channels via upward-firing speaker drivers, such as a front right up-firing channel (FRU), a front left up-firing channel (FLU), and a center up-firing channel (FCU). In some such embodiments, the front (F) channels include the set of FL, FLU, FR, FRU, FC, and FCU channels.

In some embodiments, Soundbar 702 includes a surround sound processor configured to perform the surround sound processor functions disclosed and described herein. In some embodiments, the Soundbar 702 is considered a surround sound system controller and the playback devices $Sub_1$ 710, $Sub_2$ 712, Overhead 714, Rear L 716, and Rear R 718 are considered surround sound satellites or satellite playback devices.

The $Sub_1$ 710 is configured to play a first sub channel (S1). $Sub_1$ 710 is similar to or the same as any of the subwoofer playback devices disclosed herein, including but not limited to subwoofer 110i (FIG. 1) and $Sub_2$ 712.

The $Sub_2$ 712 is configured to play a second sub channel (S2). $Sub_2$ 712 is similar to or the same as any of the subwoofer playback devices disclosed herein, including but not limited to subwoofer 110i (FIG. 1) and $Sub_1$ 710.

The Overhead 714 is configured to play one or more overhead channels (OH). In example surround sound system 700, Overhead 714 comprises a networked multi-channel amplifier configured to play multiple overhead channels via speaker drivers installed in a ceiling. For example, in some embodiments, Overhead 714 is configured to play an Overhead Right (OH-R) and an Overhead Left (OH-L) channel. In some embodiments, Overhead 714 is alternatively configured to play an Center Overhead Right (COH-R), a Center Overhead Left (COH-L), a Rear Overhead Right (RO-R), and a Rear Overhead Left (RO-L) channel. In some embodiments, the set of channels comprising two or more of OH-R, OH-L, COH-R, COH-L, RO-R, and RO-L that are played by Overhead 714 are referred to as the OH channels. In other embodiments, Overhead 714 may alternatively comprise a playback device with one or more upward-firing speaker drivers. In some embodiments, overhead 714 comprises one or more in-ceiling playback devices. In some embodiments, Overhead 714 is the same or similar to any of the playback devices disclosed herein.

Rear L 716 is configured to play a Rear Left channel (RL). In some embodiments, Rear L 716 is additionally configured to play a Rear Left Up-firing (RL-U) channel, e.g., via upward-firing speaker drivers. In some such embodiments, the set of channels comprising one or more of RL and/or RL-U that are played by Rear L 716 are referred to as the RL channels. Rear L 716 is similar to or the same as any of the playback devices disclosed herein.

Rear R 718 is configured to play a Rear Right channel (RR). In some embodiments, Rear R 718 is additionally configured to play a Rear Right Up-firing (RR-U) channel, e.g., via upward-firing speaker drivers. In some such embodiments, the set of channels comprising one or more of RR and/or RR-U that are played by Rear R 718 are referred to as the RR channels. Rear R 718 is similar to or the same as any of the playback devices disclosed herein.

Some embodiments may additionally include one or more of headphones 722a and 722b for listening to surround sound content when the other playback devices in the system 700 are muted.

In operation, in the example system 700, Soundbar 702 receives surround sound content from a surround sound content source and processes the surround sound content as described herein to generate a plurality of channel streams. Each channel stream includes surround sound audio information for playback by a playback device (e.g., the Soundbar 702 and the satellite playback devices 710-718). The Soundbar 702 then plays one or more of the generated channel streams and transmits other generated channel streams to $Sub_1$ 710, $Sub_2$ 712, Overhead 714, Rear L 716, and Rear R 718 for playback. The individual channel streams (or subchannels thereof) correspond to individual channels of surround sound audio to be played by playback devices in the surround sound system 700.

VII. Example Timing Diagram

Figure 8:
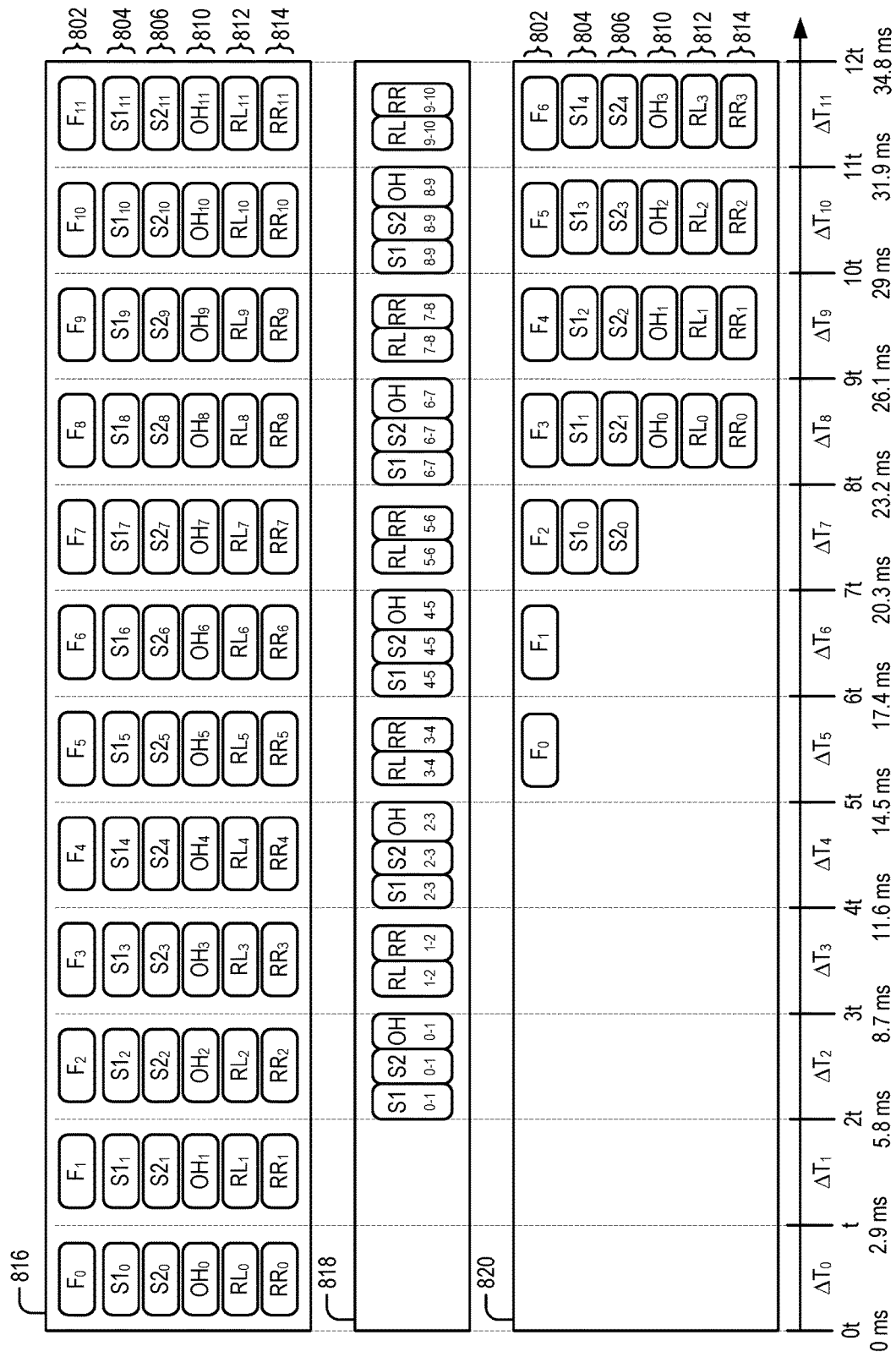
FIG. 8 an example timing diagram for generating and transmitting surround sound audio information to satellites for a multichannel surround sound audio system according to some embodiments.

FIG. 8 shows an example timing diagram 800 for generating and transmitting surround sound audio information to satellite playback devices for a multichannel surround sound system according to some embodiments. Persons of skill in the art will appreciate that the size of the frames (or sets of frames) of the channel streams shown in diagram 800 do not necessarily correspond to specific amounts of data, number of audio samples, frame/packet size, transmission duration, or other physical attributes relating to the packaging, transmission, or playback of the surround sound audio information.

With reference to the example system architecture 700 in FIG. 7, timing diagram 800 illustrates one example implementation of how Soundbar 702 generates a plurality of channel streams 802-814, plays the surround sound audio information of channel stream 802, and transmits the channel streams 804-814 to the satellite playback devices for playback, including $Sub_1$ 710, $Sub_2$ 712, Overhead 714, Rear L 716, and Rear R 718.

More particularly, region 816 of the timing diagram 800 shows the generation of channel streams 802-814 as function of a plurality of multi-millisecond timeframes illustrated along the x-axis of the diagram 800, region 818 of the timing diagram 800 shows the transmission of channel streams 804-814 as a function of the plurality of multi-millisecond timeframes, and region 820 of the timing diagram 800 shows playback of channel streams 802-814 as a function of the plurality of multi-millisecond timeframes.

The example procedures illustrated in example timing diagram 800 satisfy two important technical requirements for enabling the surround sound system 700 to play surround sound content having corresponding video content, e.g., video content for a television show, movie, video game, web video, or other video content. First, for surround sound content that has corresponding video content, it can be important for the Soundbar 702 to process and distribute the surround sound content to the satellite playback devices 710-718 for processing and playback in synchrony with the Soundbar 702 sufficiently quickly such that the surround sound content collectively played by the surround sound system 700 is not perceived to be out of sync with the corresponding video content. Second, in addition to playing the surround sound content in sync with (or at least substantially in sync with) its corresponding video content, the Soundbar 702 and the satellite playback devices 710-718 also play their respective portions of the surround sound content in synchrony with each other so that the surround sound content does not have undesirable echo effects caused by playback delays among and between the Soundbar 702 and the satellite playback devices 710-718. In some embodiments, playing the surround sound content "substantially in sync" with its corresponding video content refers to playing the surround sound content within a threshold range of timeframes before or after the corresponding video content is displayed on a screen (e.g., playing the surround sound content between about −180 ms and about +80 ms of displaying the corresponding video content, playing the surround sound content between about −130 ms and about +50 ms of displaying the corresponding video content, and/or playing the surround sound content between about −100 ms and +25 ms of displaying the corresponding video content).

In some embodiments, to ensure that the surround sound system 700 plays the surround sound content in sync with (or at least substantially in sync with) corresponding video content, the Soundbar 702 is configured play audio information for the front channels (e.g., FL, FR, and FC channels) within about 29 ms after receiving the surround sound content. This approximately 29 ms delay from receipt to playback for the Soundbar 702 serves as a reference point for the satellite playback devices 710-718 and provides a period of time for the system 700 to generate, transmit, receive, and playback the surround sound content in synchrony with each other in sync with (or at least substantially in sync with) the corresponding video content.

In some embodiments, the Soundbar 702 may be configured to play the audio information for the front channels sooner than about 29 ms after receiving the surround sound content, e.g., 25 ms, 20 ms, 18 ms, or some other shorter delay. But in some instances, using a shorter delay may cause some satellite playback devices to receive audio content after the audio content's designated playback time, thereby resulting in audio drop outs by the satellite playback device. Similarly, the Soundbar 702 may be configured to play the audio information for the front channels later than about 29 ms after receiving the surround sound content, e.g., 32 ms, 35 ms, 40 ms, or some other longer delay. But in some instances, using a longer delay may cause playback of the surround sound content to be perceived to be out of sync with the corresponding video content.

a. Generating Channel Streams

The first function performed during the approximately 29 ms timeframe includes the Soundbar 702 processing the incoming surround sound content to generate a plurality of channel streams 802-814.

In some embodiments, processing the incoming surround sound content includes mixing channels of surround sound content to generate individual channels of surround sound audio information for playback by the Soundbar 702 and the satellite playback devices 710-718. In some embodiments, processing the incoming surround sound content includes using audio object information (e.g., Dolby Atmos® or DTS:X® audio object information) to generate a plurality of channels of surround sound audio information for playback by the Soundbar 702 and the satellite playback devices 710-718.

In operation, each of the channel streams 802-814 contains surround sound audio information for playback by one of the playback devices in the system 700. In some embodiments, one or more of the channel streams comprise subchannels of surround sound audio information.

For example, in the illustrative embodiment shown in FIG. 8, the F channel stream 802 includes surround sound audio information to be played by the Soundbar 702. The surround sound audio information in the F channel stream 802 to be played by the Soundbar 702 includes 5 subchannels, including (i) front left channel (FL) audio information for playback via Front L speaker 704 of Soundbar 702, (ii) front right channel (FR) audio information for playback via Front R speaker 706 of Soundbar 702, (iii) front center channel (FC) audio information for playback via Front Center speaker 708 of Soundbar 702, (iv) front right up-firing channel (FRU) audio information for playback via a front right upward firing speaker driver (not shown), and (v) front left up-firing channel (FLU) audio information for playback via a front left upward firing speaker driver (not shown).

The S1 channel stream 804 includes surround sound audio information to be played by the $Sub_1$ 710 playback device. And the S2 channel stream 806 includes surround sound audio information to be played by the $Sub_2$ 712 playback device. In the example shown in FIG. 8, both of the S1 channel stream 804 and the S2 channel stream 806 have a single channel of surround sound audio information for each of the $Sub_1$ 710 and $Sub_2$ 712 playback devices, respectively.

The OH channel stream 810 includes surround sound audio information to be played by the Overhead 714 playback device. The surround sound audio information in the OH channel stream 810 to be played by the Overhead 714 playback device includes 2 subchannels, including (i) overhead left (OH-L) audio information for playback via a left ceiling speaker (not shown), and (ii) overhead right (OH-R) audio information for playback via a left ceiling speaker (not shown).

The RL channel stream 812 includes surround sound audio information to be played by the Rear L 716 playback device. The surround sound audio information in the RL channel stream 812 to be played by the Rear L 716 playback device includes 2 subchannels, including (i) rear left forward (RL-F) audio information for playback via a forward-firing speaker driver of the Rear L 716 playback device, and (ii) rear left upward (RL-U) audio information for playback via an upward-firing speaker driver of the Rear L 716 playback device.

And the RR channel stream 814 includes surround sound audio information to be played by the Rear R 718 playback device. The surround sound audio information in the RR channel stream 814 to be played by the Rear R 718 playback device includes 2 subchannels, including (i) rear right forward (RR-F) audio information for playback via a forward-firing speaker driver of the Rear R 718 playback device, and (ii) rear right upward (RR-U) audio information for playback via an upward-firing speaker driver of the Rear R 718 playback device.

In some embodiments, generating the plurality of channel streams 802-814 includes the Soundbar 702 generating, for each channel stream (or for channel streams with multiple subchannels, generating for each subchannel of the channel stream), (i) a series of frames (or packets, cells, or similar) comprising the surround sound audio information for the channel stream (or subchannel thereof), where each frame includes at least a portion of the surround sound audio information of the channel stream (or subchannel thereof), and (ii) playback timing for the surround sound audio information of the channel stream (or subchannel thereof).

In some embodiments, individual frames in the series of frames include both (i) a portion of the surround sound audio information and (ii) playback timing for that portion of the surround sound audio information in the frame. In some embodiments, each frame in the series of frames includes both (i) a portion of the surround sound audio information and (ii) playback timing for that portion of the surround sound audio information in the frame. As described previously, the playback timing for an individual frame includes a future time, relative to the clock time of the Soundbar 702, at which the surround sound audio information in the frame is to be played by the playback device configured to play that surround sound audio information.

In some embodiments of the example timing diagram 800, individual channel streams (or subchannels thereof) comprise the above-described plurality of frames comprising portions of surround sound audio information and playback timing for the surround sound audio information.

For example, the F channel stream 802 includes a plurality of frames represented as $F_0$-$F_{11}$, where each of $F_0$-$F_{11}$ represents 5 frames (because the F channel stream 802 has five subchannels in this example embodiment, i.e., FC, FL, FR, FLU, and FRU described above), and where each frame comprises a portion of the surround sound audio information to be played by the Soundbar 702 and timing information for that portion of the surround sound audio information to be played by the Soundbar 702. In some embodiments, rather than each frame having playback timing, the F channel stream 802 includes playback timing information for each set of 5 frames that the Soundbar 702 is to play at the same time.

The S1 channel stream 804 includes a plurality of frames represented as $S1_0$-$S1_{11}$, where each of $S1_0$-$S1_{11}$ represents 1 frame (because the S1 channel stream 804 does not have any subchannels in this example embodiment), and where each frame comprises a portion of the surround sound audio information to be played by the $Sub_1$ 710 playback device and timing information for that portion of the surround sound audio information to be played by the $Sub_1$ 710 playback device.

The S2 channel stream 806 includes a plurality of frames represented as $S2_0$-$S2_{11}$, where each of $S2_0$-$S2_{11}$ represents 1 frame (because the S2 channel stream 806 does not have any subchannels in this example embodiment), and where each frame comprises a portion of the surround sound audio information to be played by the $Sub_2$ 712 playback device and timing information for that portion of the surround sound audio information to be played by the $Sub_2$ 712 playback device.

The OH channel stream 810 includes a plurality of frames represented as $OH_0$-$OH_{11}$, where each of $OH_0$-$OH_{11}$ represents 2 frames (because the OH channel stream 810 has two subchannels in this example embodiment, i.e., OH-L and OH-R described above), and where each frame comprises a portion of the surround sound audio information to be played by the Overhead 714 playback device and timing information for that portion of the surround sound audio information to be played by the Overhead 714 playback device. In some embodiments, rather than each frame having playback timing, the OH channel stream 810 includes playback timing information for each set of 2 frames that the Overhead 714 playback device is to play at the same time.

The RL channel stream 812 includes a plurality of frames represented as $RL_0$-$RL_{11}$, where each of $RL_0$-$RL_{11}$ represents 2 frames (because the RL channel stream 812 includes two subchannels, i.e., RL-F and RL-U, described above), and where each frame comprises a portion of the surround sound audio information to be played by the Rear L 716 playback device and timing information for that portion of the surround sound audio information to be played by the Rear L 716 playback device. In some embodiments, rather than each frame having playback timing, the RL channel stream 812 includes playback timing information for each set of 2 frames that the Rear L 716 playback device is to play at the same time.

And lastly, The RR channel stream 814 includes a plurality of frames represented as $RR_0$-$RR_{11}$, where each of $RR_0$-$RR_{11}$ represents 2 frames (because the RR channel stream 814 includes two subchannels, i.e., RR-F and RR-U, described above), and where each frame comprises a portion of the surround sound audio information to be played by the Rear R 718 playback device and timing information for that portion of the surround sound audio information to be played by the Rear R 718 playback device. In some embodiments, rather than each frame having playback timing, the RR channel stream 814 includes playback timing information for each set of 2 frames that the Rear R 718 playback device is to play at the same time.

Thus, in the example configuration of FIGS. 7 and 8, the surround sound system 700 comprises 13 channels. In particular, 5 front channels (FC, FL, FR, FLU, and FRU), 2 subwoofer channels (S1 and S2), 2 overhead channels (OH-L and OH-R), 2 rear left channels (RL-F and RL-U), and 2 rear right channels (RR-F and RR-U). In operation, the Soundbar 702 plays the 5 front channels and transmits the 8 other channels to the satellite playback devices via 5 channel streams. However, in other embodiments, individual channel streams may have more or fewer subchannels (or perhaps no subchannels) than the example shown here. Additionally, other embodiments may have more or fewer channel streams and/or more or fewer satellite playback devices.

Time-critical applications like distributing the multiple channel streams 802-814 comprising surround sound audio information in a real-time or substantially real-time manner to the plurality of satellite playback devices 710-718 sufficiently quickly so that the system 700 as a whole can play the surround sound content in synchrony with each other and in sync with the corresponding video content requires striking a careful balance between frame size and corresponding frame transmission rates. Accordingly, the frame size of the frames to be transmitted via each channel stream is an important consideration for the transmission scheme. Here, frame size (or packet, cell, or similar data package size) refers to the number of audio samples in each frame.

Larger frame sizes (i.e., more audio samples per frame) can deliver more audio samples per frame to a satellite playback device, thereby reducing the frequency at which the Soundbar 702 must transmit frames to the satellite playback devices. And because each frame requires some overhead (e.g., addressing, error checking, etc.), using larger frame sizes has a better surround sound audio information to overhead ratio than using smaller frame sizes because more of the transmission bandwidth is used for surround sound audio information rather than frame overhead. However, larger frame sizes take longer to transmit than smaller frame sizes (i.e., fewer audio samples per frame), and because the LAN is a shared transmission medium and prone to collisions with transmissions from other devices on the network and radio frequency (RF) interference, larger frame sizes are more prone to corruption during transmission by collisions and RF interference than smaller frame sizes, which in turn tends to increase the number of retransmissions required to deliver all the frames to all the satellite playback devices over the network.

On the other hand, while using smaller frame sizes tends to reduce the number of retransmissions, using smaller frame sizes increases the frequency at which the Soundbar 702 must transmit frames to the satellite playback devices. Further, because, as explained previously, each frame requires some frame overhead (e.g., addressing, error checking, etc.), using a larger number of smaller-sized frames has a lower surround sound audio information to overhead ratio than a transmission scheme that uses a smaller number of larger-sized frames. Thus, using a larger number of smaller-sized frames results in more system bandwidth being used to transmit frame overhead (rather than actual surround sound audio information) as compared to using a smaller number of larger-sized frames. Additionally, using a larger number of smaller-sized frames requires the Soundbar 702 to generate more frames-per-millisecond and requires each satellite playback device to process more frames-per-millisecond as compared to using a smaller number of larger-sized frames.

In some embodiments, each frame of the plurality of frames in each channel stream of the plurality channel streams 802-814 comprises 256 samples of audio information, corresponding to 5.8 ms of audio at a 44.1 kHz sample rate. Other frame sizes comprising more or fewer audio samples corresponding to more or less audio content at higher or lower sample rates could be used, too, e.g., 128 samples or 512 samples. In some embodiments, the size of frames (or packets) transmitted via some channel streams may be larger or smaller than the size of frames (or packets) transmitted via other channel streams.

In the example timing diagram 800, during timeframe $\Delta T_x$, Soundbar 702 generates frame$_x$ of each channel stream (or subchannel thereof) in the plurality of channel streams 802-814. For example, during timeframe $\Delta T_0$, Soundbar 702 generates (i) the five frames $F_0$ of the F channel stream 802 (one frame for each of FC, FR, FL, FRU, and FLU), (ii) the single frame $S1_0$ of the S1 channel stream 804, (iii) the single frame $S2_0$ of the S2 channel stream 806, (iv) the two frames $OH_0$ of the OH channel stream 810 (one frame for each of OH-L and OH-R), (v) the two frames $RL_0$ of the RL channel stream 812 (one frame for each of RL-F and RL-U), and (vi) the two frames $RR_0$ of the RR channel stream 814 (one frame for each of RR-F and RR-U).

Similarly, during timeframe $\Delta T_1$, Soundbar 702 generates (i) the five frames $F_1$ of the F channel stream 802 (one frame for each of FC, FR, FL, FRU, and FLU), (ii) the single frame $S1_1$ of the S1 channel stream 804, (iii) the single frame $S2_1$ of the S2 channel stream 806, (iv) the two frames $OH_1$ of the OH channel stream 810 (one frame for each of OH-L and OH-R), (v) the two frames $RL_1$ of the RL channel stream 812 (one frame for each of RL-F and RL-U), and (vi) the two frames $RR_1$ of the RR channel stream 814 (one frame for each of RR-F and RR-U).

During timeframe $\Delta T_2$, Soundbar 702 generates (i) the five frames $F_2$ of the F channel stream 802 (one frame for each of FC, FR, FL, FRU, and FLU), (ii) the single frame $S1_2$ of the S1 channel stream 804, (iii) the single frame $S2_2$ of the S2 channel stream 806, (iv) the two frames $OH_2$ of the OH channel stream 810 (one frame for each of OH-L and OH-R), (v) the two frames $RL_2$ of the RL channel stream 812 (one frame for each of RL-F and RL-U), and (vi) the two frames $RR_2$ of the RR channel stream 814 (one frame for each of RR-F and RR-U).

During timeframe $\Delta T_3$, Soundbar 702 generates (i) the five frames $F_3$ of the F channel stream 802 (one frame for each of FC, FR, FL, FRU, and FLU) (ii) the single frame $S1_3$ of the S1 channel stream 804, (iii) the single frame $S2_3$ of the S2 channel stream 806, (iv) the two frames $OH_3$ of the OH channel stream 810 (one frame for each of OH-L and OH-R), (v) the two frames $RL_3$ of the RL channel stream 812 (one for each of RL-F and RL-U), and (vi) the two frames $RR_3$ of the RR channel stream 814 (one for each of RR-F and RR-U).

In operation, the Soundbar 702 continues to generate frames for each of the channel streams 802-814 in this manner until the Soundbar 702 ceases to receive surround sound content from the surround sound source.

b. Transmitting Channel Streams

The second function performed during the approximately 29 ms timeframe includes the Soundbar 702 transmitting channel streams 804-814 to corresponding satellite playback devices 710-718 via the LAN 720. Region 818 of timing diagram 800 shows the transmission of channel streams from the Soundbar 702 to the satellite playback devices 710-718.

In operation, to provide some aspects of the surround sound effect, some of the satellite playback devices 710-718 are configured to play portions of the surround sound audio information earlier or later than other satellite playback devices, relative to playback of corresponding portions of the surround sound audio information by the Soundbar 702.

In the example timing diagram 800, the subwoofer playback devices (e.g., $Sub_1$ 710 and $Sub_2$ 712) are configured to play their portions of the surround sound audio information about 5 ms after the Soundbar 702 plays its same corresponding portion of the surround sound audio information, i.e., or about 34 ms after the Soundbar 702 has received and decoded the incoming surround sound content from the surround sound content source. And the other satellite playback devices (e.g., Overhead 714, Rear L 716, and Rear R 718) are configured to play their respective portions of the surround sound audio information about 10 ms after the Soundbar 702 plays its corresponding portion of the surround sound audio information, i.e., about 39 ms after the Soundbar 702 has received and decoded the surround sound content from the surround sound content source. However, other example configurations could use different delay times relative to the Soundbar 702 and/or different delay times for different satellite playback devices, depending on the number and configuration of playback devices in the surround sound system, and at least to some extent, aspects of the desired surround sound effect.

In some embodiments, Soundbar 702 incorporates the delay time for an individual satellite playback device into the playback timing information for the surround sound audio information in the channel stream for that satellite playback device. In other embodiments, an individual satellite playback device can incorporate its delay time by using the delay time (e.g., 5-10 ms or some other amount of delay time) to adjust either (i) the "timing offset" between the satellite playback device clock timing and the Soundbar 702 clock timing or (ii) the "local" playback timing that the satellite playback device determines for individual frames of the surround sound audio information received via the channel stream assigned to the satellite playback device.

But to ensure that the satellite playback devices 710-718 receive their corresponding portions of the surround sound audio information in sufficient time for the satellite playback devices 710-718 to process and play their corresponding potions of the surround sound audio information at the appropriate playback time, and because the LAN 720 is a shared transmission medium, the Soundbar 702 prioritizes the transmission of channel streams for satellite playback devices having shorter delay times relative to the Soundbar 702 ahead of channel streams for satellite playback devices having longer delay times relative to the Soundbar 702. Therefore, in the above-described example where $Sub_1$ 710 and $Sub_2$ 712 are configured play their portions of the surround sound content 5 ms after the Soundbar 702 plays its corresponding portions of the surround sound content, and Overhead 714, Rear L 716, and Rear R 718 are configured to play their portions of the surround sound content 10 ms after the Soundbar 702 plays its corresponding portions, the Soundbar 702 prioritizes transmission of the channel streams for the subwoofer playback devices ahead of the channel streams for the overhead and rear playback devices.

In the example timing diagram 800, Soundbar 702 (*i*) during a first time interval, transmits a first set of frames of channel streams S1, S2, and OH, and (ii) during a second time interval following the first time interval, transmits a second set of frames of channels streams RL and RR.

For example, after a time delay of 2t to accumulate frames for transmission, Soundbar 702 begins transmitting frames comprising surround sound audio information to the satellite playback devices 710-718.

During timeframe $\Delta T_2$, Soundbar 702 transmits (a) the $S1_0$ and $S1_1$ frames of the S1 channel stream 804 to $Sub_1$ 710, (b) the $S2_0$ and $S2_1$ frames of the S2 channel stream 806 to $Sub_2$ 712, and (c) the $OH_0$ and $OH_1$ frames of the OH channel stream 810 to Overhead 714.

During timeframe $\Delta T_3$, Soundbar 702 transmits (a) the $RL_1$ and $RL_2$ frames of the RL channel stream 812 to Rear L 716, and (b) the $RR_1$ and $RR_2$ frames of the RR channel stream 814 to Rear R 718.

During timeframe $\Delta T_4$, Soundbar 702 transmits (a) the $S1_2$ and $S1_3$ frames of the S1 channel stream 804 to $Sub_1$ 710, (b) the $S2_2$ and $S2_3$ frames of the S2 channel stream 806 to $Sub_2$ 712, and (c) the $OH_2$ and $OH_3$ frames of the OH channel stream 810 to Overhead 714

During timeframe $\Delta T_5$, Soundbar 702 transmits (a) the $RL_3$ and $RL_4$ frames of the RL channel stream 812 to Rear L 716, and (b) the $RR_3$ and $RR_4$ frames of the RR channel stream 814 to Rear R 718.

During timeframe $\Delta T_6$, Soundbar 702 transmits (a) the $S1_4$ and $S1_5$ frames of the S1 channel stream 804 to $Sub_1$ 710, (b) the $S2_4$ and $S2_5$ frames of the S2 channel stream 806 to $Sub_2$ 712, and (c) the $OH_4$ and $OH_5$ frames of the OH channel stream 810 to Overhead 714.

During timeframe $\Delta T_7$, Soundbar 702 transmits (a) the $RL_5$ and $RL_6$ frames of the RL channel stream 812 to Rear L 716, and (b) the $RR_5$ and $RR_6$ frames of the RR channel stream 814 to Rear R 718.

In operation, the Soundbar 702 continues to transmit frames for each of the channel streams 804-814 to their corresponding satellite playback devices 710-718 in this manner until the Soundbar 702 ceases to receive surround sound content from the surround sound source.

The 2t delay between frame generation and frame transmission introduces an otherwise undesirable delay in the overall playback scheme because it reduces the amount of time available for the Soundbar 702 to transmit the frames to the satellite playback devices and for the satellite playback devices to receive, process, and play the surround sound audio information within the frames as described herein. As mentioned above, one important requirement for playing surround sound content that has associated video content is that the surround sound system 700 play the surround sound content in sync (or at least substantially in sync) with the video content. Adding the additional 2t delay increases the risk that playback of the surround sound content will not be sufficiently in sync with presentation of the corresponding video content. However, in this instance, the 2t delay enables the Soundbar 702 to accumulate more audio samples to transmit to each satellite playback device, thereby improving the transmission efficiency of the system by transmitting more audio samples per frame.

Although the timing diagram 800 shows fairly even and consistent transmission of frames (or sets of frames) from the Soundbar 702 to the individual satellite playback devices 710-718, in practice, the actual transmission times (and durations) may fluctuate within a particular time interval, and some transmissions may even occur in a later interval because of contentions when seizing the RF channel for transmission, collisions and backoffs, RF interference, retransmissions, processor delays, and/or other computing and/or network situations that may cause minor irregularities and/or inconsistencies in the transmission and reception of the frames between the Soundbar 702 and the satellite playback devices 710-718 via the LAN 720. In some embodiments, allowing for extra time during every other time period as illustrated in example 800 provides opportunities for the system 700 to catch up after minor delays in the transmission, reception, and/or playback of the audio information via the channel streams.

c. Playing Surround Sound Audio Content from Channel Streams

The third function performed during the approximately 29 ms timeframe includes each satellite playback device 710-718 receiving its corresponding channel stream 804-814 from the Soundbar 702 via the LAN 720, processing the channel stream to extract the surround sound audio information from the channel stream, and then use the surround sound audio information, the playback timing information, and clock information to play the surround sound audio information in synchrony with the Soundbar 702 and the other satellite playback devices of the system 700.

Region 820 of timing diagram 800 shows when the Soundbar 702 and the individual satellite playback devices 710-718 play corresponding portions of the surround sound content. In operation, the Soundbar 702 and the individual satellite playback devices 710-718 all play surround sound audio information of their corresponding channel streams based on playback timing and clock timing as described earlier in detail herein.

During timeframe $\Delta T_5$, Soundbar 702 plays the surround sound audio information in the $F_0$ frames.

During $\Delta T_6$, Soundbar 702 plays the surround sound audio information in the $F_1$ frames.

During $\Delta T_7$, Soundbar 702 plays the surround sound audio information in the $F_2$ frames, the $Sub_1$ 710 playback device plays the surround sound audio information in the $S1_0$ frames, and the $Sub_2$ 712 playback device plays the surround sound audio information in the $S2_0$ frames.

During $\Delta T_8$, Soundbar 702 plays the surround sound audio information in the $F_3$ frames, the $Sub_1$ 710 playback device plays the surround sound audio information in the $S1_1$ frames, the $Sub_2$ 712 playback device plays the surround sound audio information in the $S2_1$ frames, the Overhead 714 playback device plays the surround sound audio information in the $OH_0$ frames, the Rear L 716 playback device plays the surround sound audio information in the $RL_0$ frames, and the Rear R 718 playback device plays the surround sound audio information in the $RR_0$ frames.

During $\Delta T_9$, Soundbar 702 plays the surround sound audio information in the $F_4$ frames, the $Sub_1$ 710 playback device plays the surround sound audio information in the $S1_2$ frames, the $Sub_2$ 712 playback device plays the surround sound audio information in the $S2_2$ frames, the Overhead 714 playback device plays the surround sound audio information in the $OH_1$ frames, the Rear L 716 playback device plays the surround sound audio information in the $RL_1$ frames, and the Rear R 718 playback device plays the surround sound audio information in the $RR_1$ frames.

During $\Delta T_{10}$, Soundbar 702 plays the surround sound audio information in the $F_5$ frames, the $Sub_1$ 710 playback device plays the surround sound audio information in the $S1_3$ frames, the $Sub_2$ 712 playback device plays the surround sound audio information in the $S2_3$ frames, the Overhead 714 playback device plays the surround sound audio information in the $OH_2$ frames, the Rear L 716 playback device plays the surround sound audio information in the $RL_2$ frames, and the Rear R 718 playback device plays the surround sound audio information in the $RR_2$ frames.

As shown in the timing diagram 800, the subwoofer playback devices ($Sub_1$ 710 and $Sub_2$ 712) play their portions of the surround sound audio information about 5 ms after the Soundbar 702 plays its same corresponding portions of the surround sound audio information. And the other satellite playback devices (Overhead 714, Rear L 716, and Rear R 718) play their respective portions of the surround sound audio information about 10 ms after the Soundbar 702 plays its corresponding portions of the surround sound audio information.

VII. Example Method

Figure 9:
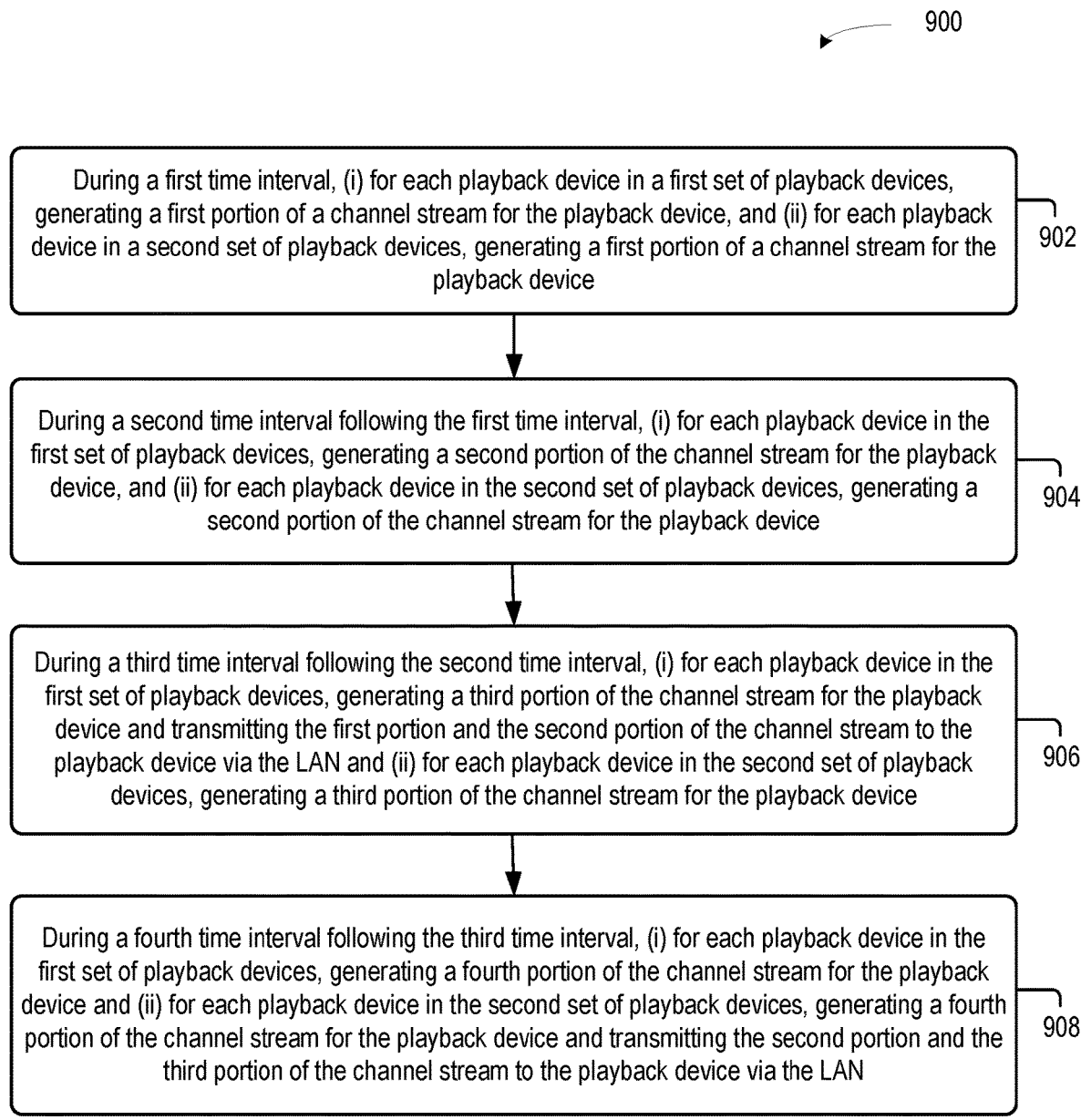
FIG. 9 shows an example method for generating and transmitting surround sound audio information to satellites for a multichannel surround sound audio system according to some embodiments.

FIG. 9 shows an example method 900 for generating and transmitting surround sound audio information to satellites for a multichannel surround sound system according to some embodiments.

Example method 900 describes certain functions performed by a soundbar component, such as Soundbar 702. However, method 900 and/or aspects thereof could be performed by any other type of device comprising one or more processors configured to perform the features and functions recited in method 900, including but not limited to one or more of a different type of playback device, a television, a computing device, an audio/video controller, a set-top box, a media streaming device (e.g., an AppleTV, Amazon Fire, Roku, or similar), a gaming console, or similar devices now known or later developed, acting individually or in concert with each other.

Method 900 begins at block 902, which includes, during a first time interval, (i) for each playback device in a first set of playback devices, generating a first portion of a channel stream for the playback device, and (ii) for each playback device in a second set of playback devices, generating a first portion of a channel stream for the playback device.

In some embodiments, the first set of playback devices includes subwoofer and overhead playback devices, such as satellite playback devices $Sub_1$ 710, $Sub_2$ 712, and Overhead 714 shown in FIG. 7. In some embodiments, the second set of playback devices includes rear playback devices, such as satellite playback devices Rear L 716, and Rear R 718 shown in FIG. 7.

In some embodiments, block 902 additionally includes, during the first time interval, additionally generating a first portion of a channel stream for the soundbar.

Next, method 900 advances to block 904, which includes, during a second time interval following the first time interval, (i) for each playback device in the first set of playback devices, generating a second portion of the channel stream for the playback device, and (ii) for each playback device in the second set of playback devices, generating a second portion of the channel stream for the playback device.

In some embodiments, block 904 additionally includes, during the second time interval following the first time interval, additionally generating a second portion of the channel stream for the soundbar.

Next, method 900 advances to block 906, which includes, during a third time interval following the second time interval, (i) for each playback device in the first set of playback devices, generating a third portion of the channel stream for the playback device and transmitting the first portion and the second portion of the channel stream to the playback device via the LAN and (ii) for each playback device in the second set of playback devices, generating a third portion of the channel stream for the playback device. In some embodiments, the LAN comprises one or more of a wireless LAN, a wired LAN, or any other type of LAN now known or later developed.

In some embodiments, block 906 additionally includes, during the third time interval following the second time interval, additionally generating a third portion of the channel stream for the soundbar.

In some embodiments, transmitting the first portion and the second portion of the channel stream to an individual playback device via the LAN in block 906 comprises (i) generating one or more packets comprising the first portion and the second portion of the channel stream and playback timing for the first portion and the second portion of the channel stream for the individual playback device, where the playback timing specifies a future time at which the individual playback device is to play the first portion and the second portion of the channel stream; and (ii) transmitting the one or more packets to the individual playback device via the LAN.

And finally, method 900 advances to block 908, which includes during a fourth time interval following the third time interval, (i) for each playback device in the first set of playback devices, generating a fourth portion of the channel stream for the playback device and (ii) for each playback device in the second set of playback devices, generating a fourth portion of the channel stream for the playback device and transmitting the second portion and the third portion of the channel stream to the playback device via the LAN.

In some embodiments, block 908 additionally includes, during the fourth time interval following the third time interval, additionally generating a fourth portion of the channel stream for the soundbar.

In some embodiments, method 900 additionally includes receiving surround sound content comprising surround sound audio information and surround sound audio object data. In operation, individual channel streams for the playback devices are based on the surround sound audio information and surround sound audio object data.

In some embodiments, method 900 additionally includes providing clock timing information of a clock at the soundbar to the playback devices in the first set of playback devices and the second set of playback devices. In some embodiments, the clock timing information is suitable for an individual playback device to determine a difference between the clock at the soundbar and a clock at the individual playback device.

In some embodiments, the first time interval, the second time interval, the third time interval, and the fourth time interval have substantially the same duration. In some embodiments, the time intervals are considered to be of substantially the same duration when each of the time intervals is within about +/−x % of the same time duration, where x is between about 0-15%. In some embodiments, the time intervals are considered to be of substantially the same duration when each of the time intervals is within about +/−y microseconds of the same time duration, where y is between about 0-500 microseconds. In some embodiments, each of the first time interval, the second time interval, the third time interval, and the fourth time interval is about 2.9 ms, and an individual portion of the channel stream for an individual playback device comprises about 5.8 ms of surround sound audio information. In some embodiments, each of the first time interval, the second time interval, the third time interval, and the fourth time interval is z ms, and an individual portion of the channel stream for an individual playback device comprises about 2z ms of surround sound audio information, where z is between about 1.5 to 4.5 milliseconds.

In some embodiments, method 900 additionally includes one or more of (i) during a fifth time interval following the fourth time interval, playing the first portion of the channel stream for the soundbar; (ii) during a sixth time interval following the fifth time interval, playing the second portion of the channel stream for the soundbar; (iii) during a seventh time interval following the sixth time interval, playing the third portion of the channel stream for the soundbar while (iii-a) the first subwoofer plays the first portion of the channel stream for the first subwoofer and (iii-b) the second subwoofer plays the first portion of the channel stream for the second subwoofer; and (iv) during an eight time interval following the seventh time interval, playing the fourth portion of the channel stream for the soundbar while (iv-a) the first subwoofer plays the second portion of the channel stream for the first subwoofer, (iv-b) the second subwoofer plays the second portion of the channel stream for the second subwoofer, (iv-c) the overhead speaker plays the first portion of the channel stream for the overhead speaker, (iv-d) the rear left speaker plays the first portion of the channel stream for the rear left speaker, and (iv-e) the rear right speaker plays the first portion of the channel stream for the rear right speaker.

VIII. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A soundbar comprising:
one or more processors;
one or more speaker drivers;
one or more network interfaces configured to communicatively couple the soundbar to a local area network (LAN); and
tangible, non-transitory computer-readable media with instructions encoded thereon, wherein the instructions, when executed, cause the soundbar to perform functions comprising:
during a first time interval, (i) for each playback device in a first set of playback devices, generating a first portion of a channel stream for the playback device, and (ii) for each playback device in a second set of playback devices, generating a first portion of a channel stream for the playback device;
during a second time interval following the first time interval, (i) for each playback device in the first set of playback devices, generating a second portion of the channel stream for the playback device, and (ii) for each playback device in the second set of playback devices, generating a second portion of the channel stream for the playback device;
during a third time interval following the second time interval, (i) for each playback device in the first set of playback devices, generating a third portion of the channel stream for the playback device and transmitting the first portion and the second portion of the channel stream to the playback device via the LAN and (ii) for each playback device in the second set of playback devices, generating a third portion of the channel stream for the playback device; and during a fourth time interval following the third time interval, (i) for each playback device in the first set of playback devices, generating a fourth portion of the channel stream for the playback device and (ii) for each playback device in the second set of playback devices, generating a fourth portion of the channel stream for the playback device and transmitting the second portion and the third portion of the channel stream to the playback device via the LAN.

2. The soundbar of claim 1, wherein the functions further comprise:
receiving surround sound content comprising surround sound audio information and surround sound audio object data, and wherein individual channel streams are based on the surround sound audio information and surround sound audio object data.

3. The soundbar of claim 1, wherein the LAN comprises one or more of a wireless LAN or a wired LAN.

4. The soundbar of claim 1, wherein the first time interval, the second time interval, the third time interval, and the fourth time interval have substantially the same duration.

5. The soundbar of claim 1, wherein each of the first time interval, the second time interval, the third time interval, and the fourth time interval is about 2.9 ms, and wherein an individual portion of the channel stream for an individual playback device comprises about 5.8 ms of audio.

6. The soundbar of claim 1, wherein transmitting the first portion and the second portion of the channel stream to an individual playback device via the LAN comprises:
generating one or more packets comprising the first portion and the second portion of the channel stream and playback timing for the first portion and the second portion of the channel stream for the individual playback device, wherein the playback timing specifies a future time at which the individual playback device is to play the first portion and the second portion of the channel stream; and
transmitting the one or more packets to the individual playback device via the LAN.

7. The soundbar of claim 1, wherein the functions further comprise:
providing clock timing information of a clock at the soundbar to individual playback devices in the first set of playback devices and the second set of playback devices, wherein the clock timing information is suitable for an individual playback device to determine a difference between the clock at the soundbar and a clock at the individual playback device.

8. The soundbar of claim 1, wherein the first set of playback devices comprises a first subwoofer, a second subwoofer, and an overhead speaker, and wherein the second set of playback devices comprises a left rear speaker and a right rear speaker.

9. The soundbar of claim 8, wherein the functions further comprise:
during the first time interval, additionally generating a first portion of a channel stream for the soundbar;
during the second time interval following the first time interval, additionally generating a second portion of the channel stream for the soundbar;

during the third time interval following the second time interval, additionally generating a third portion of the channel stream for the soundbar; and
during the fourth time interval following the third time interval, additionally generating a fourth portion of the channel stream for the soundbar.

10. The soundbar of claim 9, wherein the functions further comprise:
during a fifth time interval following the fourth time interval, playing the first portion of the channel stream for the soundbar;
during a sixth time interval following the fifth time interval, playing the second portion of the channel stream for the soundbar;
during a seventh time interval following the sixth time interval, playing the third portion of the channel stream for the soundbar while (i) the first subwoofer plays the first portion of the channel stream for the first subwoofer and (ii) the second subwoofer plays the first portion of the channel stream for the second subwoofer; and
during an eight time interval following the seventh time interval, playing the fourth portion of the channel stream for the soundbar while (i) the first subwoofer plays the second portion of the channel stream for the first subwoofer, (ii) the second subwoofer plays the second portion of the channel stream for the second subwoofer, (iii) the overhead speaker plays the first portion of the channel stream for the overhead speaker, (iv) the rear left speaker plays the first portion of the channel stream for the rear left speaker, and (v) the rear right speaker plays the first portion of the channel stream for the rear right speaker.

11. Tangible, non-transitory computer-readable media comprising instructions encoded therein, wherein the instructions, when executed by one or more processors, cause a soundbar to perform functions comprising:
during a first time interval, (i) for each playback device in a first set of playback devices, generating a first portion of a channel stream for the playback device, and (ii) for each playback device in a second set of playback devices, generating a first portion of a channel stream for the playback device;
during a second time interval following the first time interval, (i) for each playback device in the first set of playback devices, generating a second portion of the channel stream for the playback device, and (ii) for each playback device in the second set of playback devices, generating a second portion of the channel stream for the playback device;
during a third time interval following the second time interval, (i) for each playback device in the first set of playback devices, generating a third portion of the channel stream for the playback device and transmitting the first portion and the second portion of the channel stream to the playback device via a local area network (LAN) and (ii) for each playback device in the second set of playback devices, generating a third portion of the channel stream for the playback device; and
during a fourth time interval following the third time interval, (i) for each playback device in the first set of playback devices, generating a fourth portion of the channel stream for the playback device and (ii) for each playback device in the second set of playback devices, generating a fourth portion of the channel stream for the playback device and transmitting the second portion and the third portion of the channel stream to the playback device via the LAN.

12. The tangible, non-transitory computer-readable media of claim 11, wherein the functions further comprise:
receiving surround sound content comprising surround sound audio information and surround sound audio object data, and wherein individual channel streams are based on the surround sound audio information and surround sound audio object data.

13. The tangible, non-transitory computer-readable media of claim 11, wherein the LAN comprises one or more of a wireless LAN or a wired LAN.

14. The tangible, non-transitory computer-readable media of claim 11, wherein the first time interval, the second time interval, the third time interval, and the fourth time interval have substantially the same duration.

15. The tangible, non-transitory computer-readable media of claim 11, wherein each of the first time interval, the second time interval, the third time interval, and the fourth time interval is about 2.9 ms, and wherein an individual portion of the channel stream for an individual playback device comprises about 5.8 ms of audio.

16. The tangible, non-transitory computer-readable media of claim 11, wherein transmitting the first portion and the second portion of the channel stream to an individual playback device via the LAN comprises:
generating one or more packets comprising the first portion and the second portion of the channel stream and playback timing for the first portion and the second portion of the channel stream for the individual playback device, wherein the playback timing specifies a future time at which the individual playback device is to play the first portion and the second portion of the channel stream; and
transmitting the one or more packets to the individual playback device via the LAN.

17. The tangible, non-transitory computer-readable media of claim 11, wherein the functions further comprise:
providing clock timing information of a clock at the soundbar to individual playback devices in the first set of playback devices and the second set of playback devices, wherein the clock timing information is suitable for an individual playback device to determine a difference between the clock at the soundbar and a clock at the individual playback device.

18. The tangible, non-transitory computer-readable media of claim 11, wherein the first set of playback devices comprises a first subwoofer, a second subwoofer, and an overhead speaker, and wherein the second set of playback devices comprises a left rear speaker and a right rear speaker.

19. The tangible, non-transitory computer-readable media of claim 18, wherein the functions further comprise:
during the first time interval, additionally generating a first portion of a channel stream for the soundbar;
during the second time interval following the first time interval, additionally generating a second portion of the channel stream for the soundbar;
during the third time interval following the second time interval, additionally generating a third portion of the channel stream for the soundbar; and
during the fourth time interval following the third time interval, additionally generating a fourth portion of the channel stream for the soundbar.

20. The tangible, non-transitory computer-readable media of claim 19, wherein the functions further comprise:
during a fifth time interval following the fourth time interval, playing the first portion of the channel stream for the soundbar;
during a sixth time interval following the fifth time interval, playing the second portion of the channel stream for the soundbar;
during a seventh time interval following the sixth time interval, playing the third portion of the channel stream for the soundbar while (i) the first subwoofer plays the first portion of the channel stream for the first subwoofer and (ii) the second subwoofer plays the first portion of the channel stream for the second subwoofer; and
during an eight time interval following the seventh time interval, playing the fourth portion of the channel stream for the soundbar while (i) the first subwoofer plays the second portion of the channel stream for the first subwoofer, (ii) the second subwoofer plays the second portion of the channel stream for the second subwoofer, (iii) the overhead speaker plays the first portion of the channel stream for the overhead speaker, (iv) the rear left speaker plays the first portion of the channel stream for the rear left speaker, and (v) the rear right speaker plays the first portion of the channel stream for the rear right speaker.

* * * * *